United States Patent
Bae et al.

(10) Patent No.: US 11,638,282 B2
(45) Date of Patent: Apr. 25, 2023

(54) METHOD, USER EQUIPMENT, APPARATUS, AND COMPUTER-READABLE STORAGE MEDIUM FOR PUSCH TRANSMISSION, AND METHOD AND BASE STATION FOR PUSCH RECEPTION

(71) Applicant: LG ELECTRONICS INC., Seoul (KR)

(72) Inventors: Duckhyun Bae, Seoul (KR); Hyunho Lee, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/735,930

(22) Filed: May 3, 2022

(65) Prior Publication Data

US 2022/0264608 A1   Aug. 18, 2022

Related U.S. Application Data

(63) Continuation of application No. PCT/KR2020/015638, filed on Nov. 9, 2020.
(Continued)

(30) Foreign Application Priority Data

Nov. 8, 2019 (KR) .................. 10-2019-0142607

(51) Int. Cl.
*H04W 72/12* (2009.01)
*H04W 72/1268* (2023.01)

(52) U.S. Cl.
CPC ... *H04W 72/1268* (2013.01); *H04W 72/1289* (2013.01)

(58) Field of Classification Search
CPC .................. H04W 72/1268; H04W 72/1289
See application file for complete search history.

(56) References Cited

U.S. PATENT DOCUMENTS

| 2019/0132862 A1 | 5/2019 | Jeon et al. |
| 2019/0149365 A1 | 5/2019 | Chatterjee et al. |
| 2021/0007087 A1* | 1/2021 | Wei .................. H04L 1/18 |

OTHER PUBLICATIONS

Huawei, HiSilicon, "Enhanced UL configured grant transmission", 3GPP TSG RAN WG1 meeting #98bis, Oct. 14-20, 2019, R1-1910071.
(Continued)

*Primary Examiner* — Khaled M Kassim
*Assistant Examiner* — Zhaohui Yang
(74) *Attorney, Agent, or Firm* — Dentons US LLP

(57) ABSTRACT

In the present specification, a user equipment may: receive RRC configuration including first configuration information relating to a first DCI format and second configuration information relating to a second DCI format; receive a configured grant configuration including a repetition scheme and resource allocation information; determine resource allocation of a configured grant on the basis of i) configuration information, which includes the same repetition scheme as the repetition scheme in the configured grant configuration, among the first configuration information and the second configuration information, and ii) the resource allocation information; and perform PUSCH transmission on the basis of the resource allocation. Each of the first configuration information and the second configuration information may include a TDRA table.

13 Claims, 12 Drawing Sheets

(a) Example of PDSCH time domain resource allocation (b) Example of PUSCH time domain resource allocation

Related U.S. Application Data

(60) Provisional application No. 62/982,026, filed on Feb. 26, 2020, provisional application No. 62/978,807, filed on Feb. 19, 2020.

(56) References Cited

OTHER PUBLICATIONS

Ericsson, "Enhancement of Configured Grant for NR URLLC", 3GPP TSG RAN WG1 Meeting #98bis, Oct. 14-20, 2019, R1-1910550.
Nokia, Nokia Shanghai Bell, "On Enhanced UL Configured Grant Transmission for NR URLLC and activation/release of multiple SPS configurations", 3GPP TSG RAN WG1 Meeting #98bis, Oct. 14-20, 2019, R1-1910869.

* cited by examiner

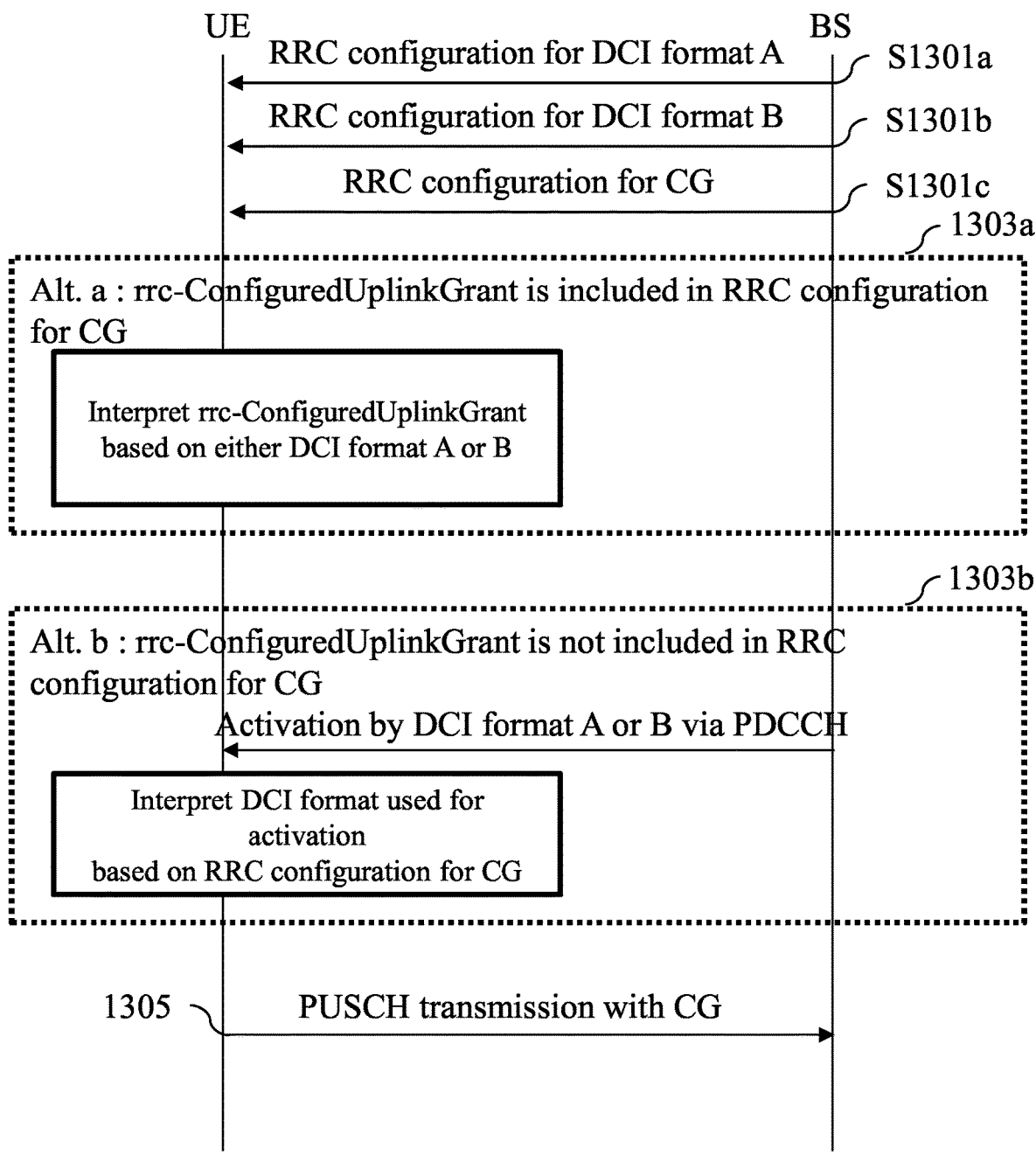

METHOD, USER EQUIPMENT, APPARATUS, AND COMPUTER-READABLE STORAGE MEDIUM FOR PUSCH TRANSMISSION, AND METHOD AND BASE STATION FOR PUSCH RECEPTION

CROSS-REFERENCE TO RELATED APPLICATIONS

Pursuant to 35 U.S.C. § 119(e), this application is a continuation of International Application PCT/KR2020/015638, with an international filing date of Nov. 9, 2020, which claims the benefit of Korean Patent Application No. 10-2019-0142607 filed on Nov. 8, 2019, U.S. Provisional Application No. 62/978,807 filed on Feb. 19, 2020, and U.S. Provisional Application No. 62/982,026 filed on Feb. 26, 2020, the contents of which are hereby incorporated by reference herein in its entirety.

TECHNICAL FIELD

The present disclosure relates to a wireless communication system.

BACKGROUND ART

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at anytime and anywhere by connecting a plurality of devices and objects to each other is one main issue to be considered in next-generation communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

DISCLOSURE

Technical Problem

As new radio communication technology has been introduced, the number of UEs to which a BS should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

The objects to be achieved with the present disclosure are not limited to what has been particularly described hereinabove and other objects not described herein will be more clearly understood by persons skilled in the art from the following detailed description.

Technical Solution

An aspect of the present disclosure provides a method of transmitting a physical uplink shared channel (PUSCH) by a user equipment (UE) in a wireless communication system. The method comprises: receiving a radio resource control (RRC) configuration including first configuration information for a first downlink control information (DCI) format and second configuration information for a second DCI format, receiving a configured grant configuration including a repetition scheme and resource allocation information, determining resource allocation of a configured grant based on i) configuration information including the same repetition scheme as the repetition scheme in the configured grant configuration among the first configuration information and the second configuration information, and ii) the resource allocation information, and performing PUSCH transmission based on the resource allocation. Each of the first configuration information and the second configuration information may include a time domain resource allocation (TDRA) table.

Another aspect of the present disclosure provides a user equipment (UE) for transmitting a physical uplink shared channel (PUSCH) in a wireless communication system. The UE includes at least one transceiver, at least one processor, and at least one computer memory operatively connected to the at least one processor and configured to store instructions that, when executed, cause the at least one processor to perform operations. The operations comprise: receiving a radio resource control (RRC) configuration including first configuration information for a first downlink control information (DCI) format and second configuration information for a second DCI format, receiving a configured grant configuration including a repetition scheme and resource allocation information, determining resource allocation of a configured grant based on i) configuration information including the same repetition scheme as the repetition scheme in the configured grant configuration among the first configuration information and the second configuration information, and ii) the resource allocation information, and performing PUSCH transmission based on the resource allocation. Each of the first configuration information and the second configuration information may include a time domain resource allocation (TDRA) table.

Another aspect of the present disclosure provides a device for a user equipment (UE). The device includes at least one processor, and at least one computer memory operatively connected to the at least one processor and configured to store instructions that, when executed, cause the at least one processor to perform operations. The operations comprise:

receiving a radio resource control (RRC) configuration including first configuration information for a first downlink control information (DCI) format and second configuration information for a second DCI format, receiving a configured grant configuration including a repetition scheme and resource allocation information, determining resource allocation of a configured grant based on i) configuration information including the same repetition scheme as the repetition scheme in the configured grant configuration among the first configuration information and the second configuration information, and ii) the resource allocation information, and performing physical uplink shared channel (PUSCH) transmission based on the resource allocation. Each of the first configuration information and the second configuration information may include a time domain resource allocation (TDRA) table.

Another aspect of the present disclosure provides a computer-readable storage medium. The computer-readable storage medium stores at least one computer program including instructions that, when executed by at least one processor, cause the at least one processor to perform operations for a user equipment (UE). The operations comprise: receiving a radio resource control (RRC) configuration including first configuration information for a first downlink control information (DCI) format and second configuration information for a second DCI format, receiving a configured grant configuration including a repetition scheme and resource allocation information, determining resource allocation of a configured grant based on i) configuration information including the same repetition scheme as the repetition scheme in the configured grant configuration among the first configuration information and the second configuration information, and ii) the resource allocation information, and performing physical uplink shared channel (PUSCH) transmission based on the resource allocation. Each of the first configuration information and the second configuration information may include a time domain resource allocation (TDRA) table.

Another aspect of the present disclosure provides a method of receiving a physical uplink shared channel (PUSCH) by a base station from a user equipment (UE) in a wireless communication device. The method comprises: transmitting a radio resource control (RRC) configuration including first configuration information for a first downlink control information (DCI) format and second configuration information for a second DCI format, generating resource allocation information for resource allocation of a configured grant, transmitting a configured grant configuration including a repetition scheme for the configured grant and the resource allocation information, and performing PUSCH reception based on the resource allocation. Generating the resource allocation information includes generating the resource allocation information based on i) configuration information including the same repetition scheme as the repetition scheme in the configured grant configuration among the first configuration information and the second configuration information, and ii) the resource allocation information. Each of the first configuration information and the second configuration information may include a time domain resource allocation (TDRA) table.

Another aspect of the present disclosure provides a base station (BS) for receiving a physical uplink shared channel (PUSCH) from a user equipment (UE) in a wireless communication system. The BS comprises: at least one transceiver, at least one processor, and at least one computer memory operatively connected to the at least one processor and configured to store instructions that, when executed, cause the at least one processor to perform operations. The operations comprise: transmitting a radio resource control (RRC) configuration including first configuration information for a first downlink control information (DCI) format and second configuration information for a second DCI format, generating resource allocation information for resource allocation of a configured grant, transmitting a configured grant configuration including a repetition scheme for the configured grant and the resource allocation information, and performing PUSCH reception based on the resource allocation. Generating the resource allocation information may include generating the resource allocation information based on i) configuration information including the same repetition scheme as the repetition scheme in the configured grant configuration among the first configuration information and the second configuration information, and ii) the resource allocation information. Each of the first configuration information and the second configuration information may include a time domain resource allocation (TDRA) table.

According to each aspect of the present disclosure, the configured grant may be a type 1 configured grant.

According to each aspect of the present disclosure, in the method by the UE, or in the operations of the UE, the device, or the computer-readable storage medium, determining the resource allocation of the configured grant may include determining resource allocation of the configured grant based on the first configuration information, based on both the first configuration information and the second configuration information including the same repetition scheme as the repetition scheme in the configured grant configuration.

According to each aspect of the present disclosure, in the method by the BS or in the operations of the BS, generating the resource allocation information may include generating the resource allocation information based on the first configuration information based on both the first configuration information and the second configuration information including the same repetition scheme as the repetition scheme in the configured grant configuration.

According to each aspect of the present disclosure, the first DCI format may be a DCI format 0_1.

According to each aspect of the present disclosure, the second DCI format may be a DCI format 0_2.

The foregoing solutions are merely a part of the examples of the present disclosure and various examples into which the technical features of the present disclosure are incorporated may be derived and understood by persons skilled in the art from the following detailed description.

Advantageous Effects

According to implementation(s) of the present disclosure, a wireless communication signal may be efficiently transmitted/received. Accordingly, the total throughput of a wireless communication system may be raised.

According to implementation(s) of the present disclosure, various services with different requirements may be efficiently supported in a wireless communication system.

According to implementation(s) of the present disclosure, delay/latency generated during radio communication between communication devices may be reduced.

The effects according to the present disclosure are not limited to what has been particularly described hereinabove and other effects not described herein will be more clearly understood by persons skilled in the art related to the present disclosure from the following detailed description.

DESCRIPTION OF DRAWINGS

The accompanying drawings, which are included to provide a further understanding of the present disclosure, illustrate examples of implementations of the present disclosure and together with the detailed description serve to explain implementations of the present disclosure:

FIG. 13 illustrates a flow of signal transmission/reception between a UE and a BS according to some implementations of the present disclosure.

MODE FOR INVENTION

Figure 1:
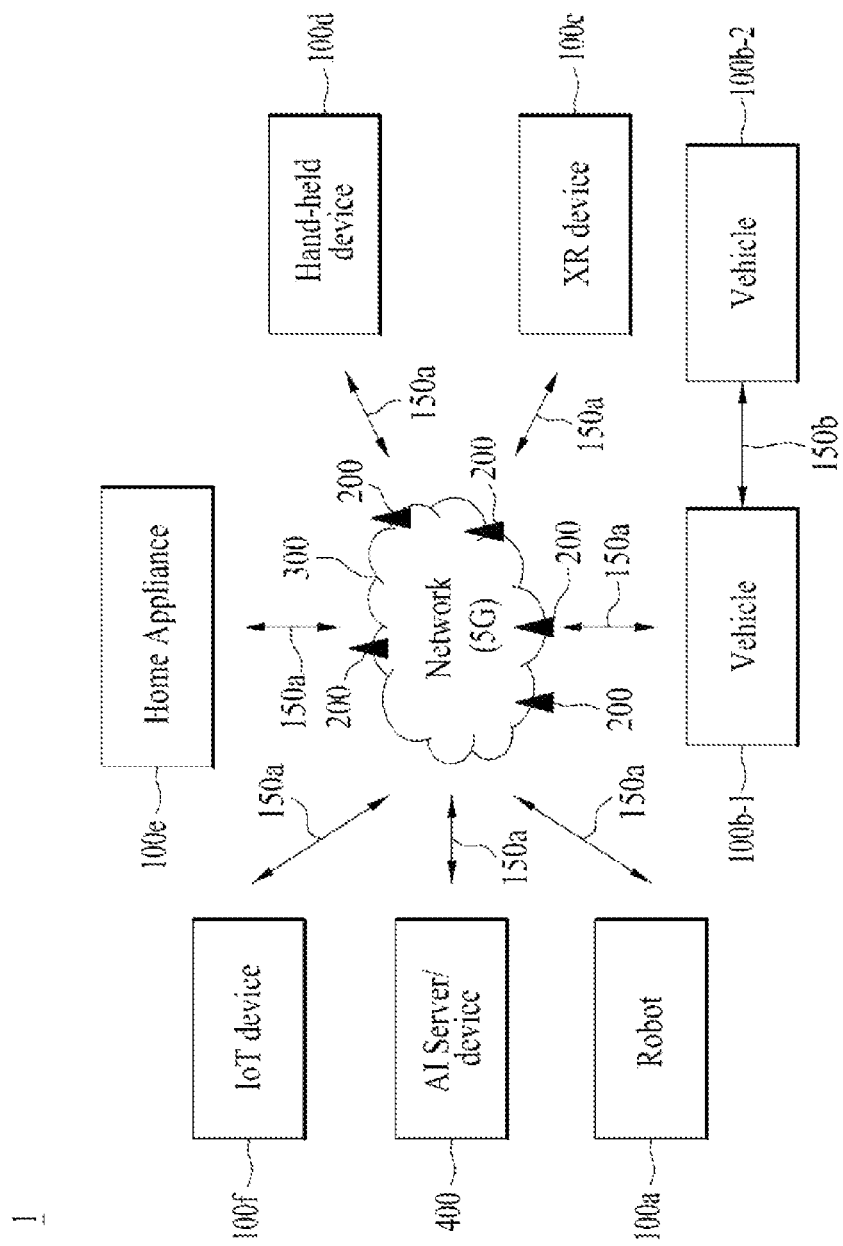
FIG. 1 illustrates an example of a communication system 1 to which implementations of the present disclosure are applied.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP based standard specifications, for example, 3GPP TS 36.211, 3GPP TS 36.212, 3GPP TS 36.213, 3GPP TS 36.321, 3GPP TS 36.300, 3GPP TS 36.331, 3GPP TS 37.213, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related with the radio resources is distinguished from a cell of a geographic area.

The "cell" of the geographic area may be understood as coverage within which a node may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. For example, the combination of the DL resources and the UL resources may be indicated by system information block type 2 (SIB2) linkage. In this case, the carrier frequency may be equal to or different from a center frequency of each cell or CC. When carrier aggregation (CA) is configured, the UE has only one radio resource control (RRC) connection with a network. During RRC connection establishment/re-establishment/handover, one serving cell provides non-access stratum (NAS) mobility information. During RRC connection re-establishment/handover, one serving cell provides security input. This cell is referred to as a primary cell (Pcell). The Pcell refers to a cell operating on a primary frequency on which the UE performs an initial connection establishment procedure or initiates a connection re-establishment procedure. According to UE capability, secondary cells (Scells) may be configured to form a set of serving cells together with the Pcell. The Scell may be configured after completion of RRC connection establishment and used to provide additional radio resources in addition to resources of a specific cell (SpCell). A carrier corresponding to the Pcell on DL is referred to as a downlink primary CC (DL PCC), and a carrier corresponding to the Pcell on UL is referred to as an uplink primary CC (UL PCC). A carrier corresponding to the Scell on DL is referred to as a downlink secondary CC (DL SCC), and a carrier corresponding to the Scell on UL is referred to as an uplink secondary CC (UL SCC).

For dual connectivity (DC) operation, the term SpCell refers to the Pcell of a master cell group (MCG) or the Pcell of a secondary cell group (SCG). The SpCell supports PUCCH transmission and contention-based random access and is always activated. The MCG is a group of service cells associated with a master node (e.g., BS) and includes the SpCell (Pcell) and optionally one or more Scells. For a UE configured with DC, the SCG is a subset of serving cells associated with a secondary node and includes a PSCell and 0 or more Scells. For a UE in RRC_CONNECTED state, not configured with CA or DC, only one serving cell including only the Pcell is present. For a UE in RRC_CONNECTED state, configured with CA or DC, the term serving cells refers to a set of cells including SpCell(s) and all Scell(s). In DC, two medium access control (MAC) entities, i.e., one MAC entity for the MCG and one MAC entity for the SCG, are configured for the UE.

A UE with which CA is configured and DC is not configured may be configured with a Pcell PUCCH group, which includes the Pcell and 0 or more Scells, and an Scell PUCCH group, which includes only Scell(s). For the Scells, an Scell on which a PUCCH associated with the corresponding cell is transmitted (hereinafter, PUCCH cell) may be configured. An Scell indicated as the PUCCH Scell belongs to the Scell PUCCH group and PUCCH transmission of related UCI is performed on the PUCCH Scell. An Scell, which is not indicated as the PUCCH Scell or in which a cell indicated for PUCCH transmission is a Pcell, belongs to the Pcell PUCCH group and PUCCH transmission of related UCI is performed on the Pcell.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PCFICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, the PDCCH refers to a set of time-frequency resource elements (REs) that carry downlink control information (DCI), and the PDSCH refers to a set of REs that carry DL data. The PUCCH, PUSCH, and PRACH refer to a set of time-frequency REs that carry uplink control information (UCI), UL data, and random access signals, respectively. In the following description, the meaning of "The UE transmits/receives the PUCCH/PUSCH/PRACH" is that the UE transmits/receives the UCI/UL data/random access signals on or through the PUCCH/PUSCH/PRACH, respectively. In addition, the meaning of "the BS transmits/receives the PBCH/PDCCH/PDSCH" is that the BS transmits the broadcast information/DCI/DL data on or through a PBCH/PDCCH/PDSCH, respectively.

In this specification, a radio resource (e.g., a time-frequency resource) scheduled or configured to the UE by the BS for transmission or reception of the PUCCH/PUSCH/PDSCH may be referred to as a PUCCH/PUSCH/PDSCH resource.

As more and more communication devices have required greater communication capacity, there has been a need for eMBB communication relative to legacy radio access technology (RAT). In addition, massive MTC for providing various services at anytime and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, massive MTC, ultra-reliable and low-latency communication (URLLC), and the like. Currently, in 3GPP, a study on the next-generation mobile communication systems after EPC is being conducted. In the present disclosure, for convenience, the corresponding technology is referred to a new RAT (NR) or fifth-generation (5G) RAT, and a system using NR or supporting NR is referred to as an NR system.

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using RAT (e.g., 5G NR or LTE (e.g., E-UTRA)) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of Things (IoT) device 100f, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless may operate as a BS/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f and the BSs 200 and between the wireless devices 100a to 100f). Here, the wireless communication/connections such as UL/DL communication 150a and sidelink communication 150b (or, device-to-device (D2D) communication) may be established by various RATs (e.g., 5G NR). The wireless devices and the BSs/wireless devices may transmit/receive radio signals to/from each other through the wireless communication/connections 150a and 150b. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
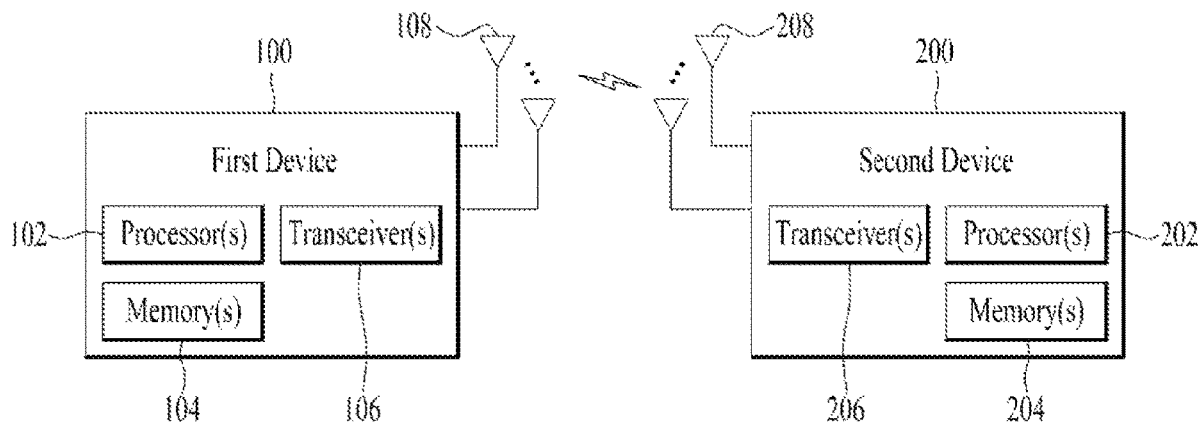
FIG. 2 is a block diagram illustrating examples of communication devices capable of performing a method according to the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs (e.g., LTE and NR). Here, {the first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the below-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the below-described/proposed procedures and/or methods. Here, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the below-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the below-described/proposed procedures and/or methods. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

The wireless communication technology implemented in the wireless devices 100 and 200 of the present disclosure may include narrowband Internet of things for low-power communication as well as LTE, NR, and 6G. For example, the NB-IoT technology may be an example of low-power wide-area network (LPWAN) technologies and implemented in standards such as LTE Cat NB1 and/or LTE Cat NB2. However, the NB-IoT technology is not limited to the above names Additionally or alternatively, the wireless communication technology implemented in the wireless devices XXX and YYY of the present disclosure may perform communication based on the LTE-M technology. For example, the LTE-M technology may be an example of LPWAN technologies and called by various names including enhanced machine type communication (eMTC). For example, the LTE-M technology may be implemented in at least one of the following various standards: 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, etc., but the LTE-M technology is not limited to the above names. Additionally or alternatively, the wireless communication technology implemented in the wireless devices XXX and YYY of the present disclosure may include at least one of ZigBee, Bluetooth, and LPWAN in consideration of low-power communication, but the wireless communication technology is not limited to the above names. For example, the ZigBee technology may create a personal area network (PAN) related to small/low-power digital communication based on various standards such as IEEE 802.15.4 and so on, and the ZigBee technology may be called by various names.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in the present disclosure. The one or more processors 102 and 202 may generate messages, control information, data, or information according to the functions, procedures, proposals, and/or methods disclosed in the present disclosure. The one or more processors 102 and 202 may generate signals (e.g., baseband signals) including PDUs, SDUs, messages, control information, data, or information according to the functions, procedures, proposals, and/or methods disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in the present disclosure may be implemented using firmware or software, and the firmware or software may be configured to include the modules, procedures, or functions. Firmware or software configured to perform the functions, procedures, proposals, and/or methods disclosed in the present disclosure may be included in the one or more processors 102 and 202 or stored in the one or more memories 104 and 204 so as to be driven by the one or more processors 102 and 202. The functions, procedures, proposals, and/or methods disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of the present disclosure, to one or more other devices. The one or more transceivers 106 and 206 may receive user data, control information, and/or radio signals/channels, mentioned in the functions, procedures, proposals, methods, and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in the present disclosure, through the one or more antennas 108 and 208. In the present disclosure, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
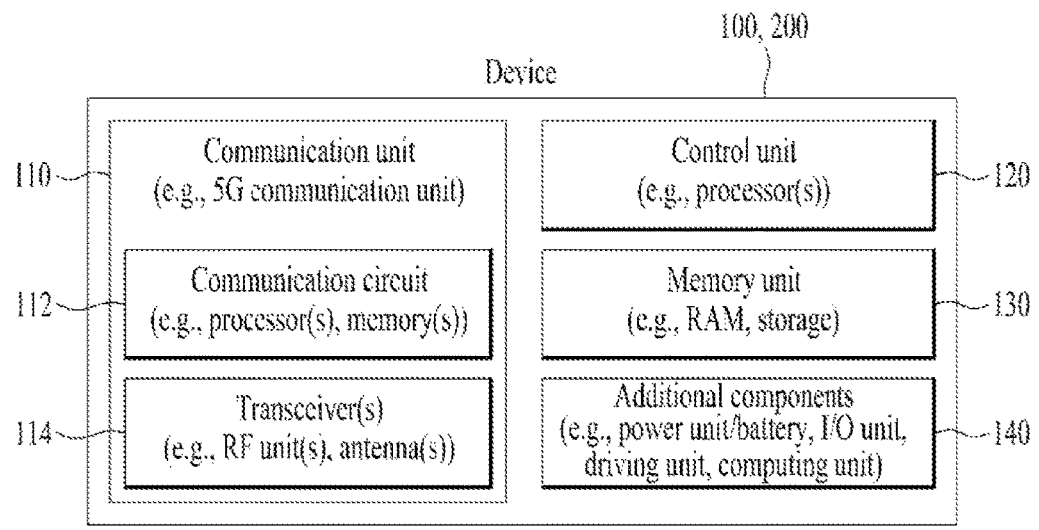
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a volatile memory, a non-volatile memory, and/or a combination thereof.

In the present disclosure, the at least one memory (e.g., 104 or 204) may store instructions or programs, and the instructions or programs may cause, when executed, at least one processor operably connected to the at least one memory to perform operations according to some embodiments or implementations of the present disclosure.

In the present disclosure, a computer readable storage medium may store at least one instruction or program, and the at least one instruction or program may cause, when executed by at least one processor, the at least one processor to perform operations according to some embodiments or implementations of the present disclosure.

In the present disclosure, a processing device or apparatus may include at least one processor, and at least one computer memory operably connected to the at least one processor. The at least one computer memory may store instructions or programs, and the instructions or programs may cause, when executed, the at least one processor operably connected to the at least one memory to perform operations according to some embodiments or implementations of the present disclosure.

A communication device of the present disclosure includes at least one processor; and at least one computer memory operably connected to the at least one processor and configured to store instructions for causing, when executed, the at least one processor to perform operations according to example(s) of the present disclosure described later.

Figure 4:
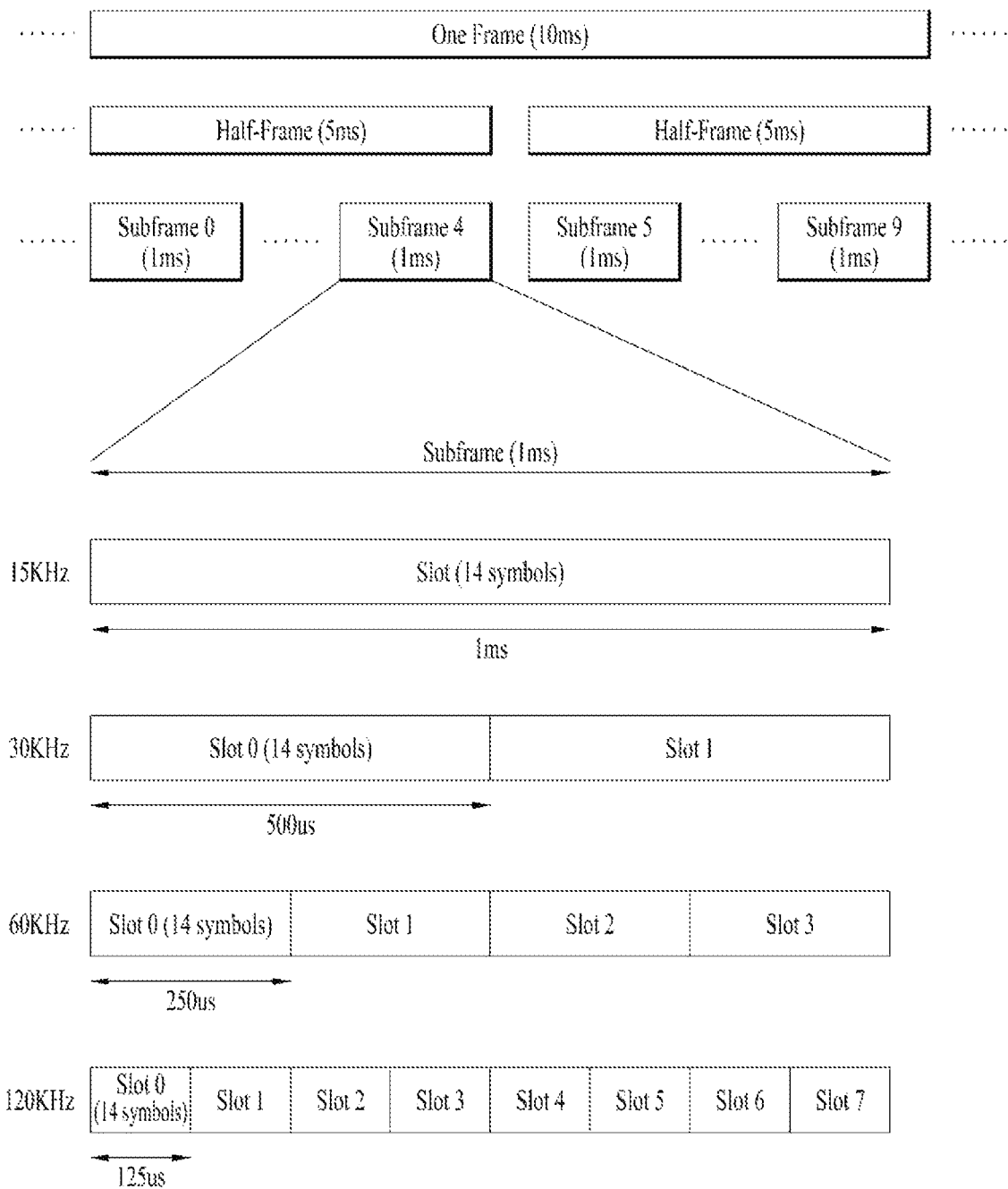
FIG. 4 illustrates an example of a frame structure used in a 3rd generation partnership project (3GPP)-based wireless communication system.

FIG. 4 illustrates an example of a frame structure used in a 3GPP-based wireless communication system.

The frame structure of FIG. 4 is purely exemplary and the number of subframes, the number of slots, and the number of symbols, in a frame, may be variously changed. In an NR system, different OFDM numerologies (e.g., subcarrier spacings (SCSs)) may be configured for multiple cells which are aggregated for one UE. Accordingly, the (absolute time) duration of a time resource including the same number of symbols (e.g., a subframe, a slot, or a transmission time interval (TTI)) may be differently configured for the aggregated cells. Here, the symbol may include an OFDM symbol (or cyclic prefix—OFDM (CP-OFDM) symbol) and an SC-FDMA symbol (or discrete Fourier transform-spread-OFDM (DFT-s-OFDM) symbol).

In the present disclosure, the symbol, the OFDM-based symbol, the OFDM symbol, the CP-OFDM symbol, and the DFT-s-OFDM symbol are used interchangeably.

Referring to FIG. 4, in the NR system, UL and DL transmissions are organized into frames. Each frame has a duration of $T_f=(\Delta f_{max} * N_f/100) * T_c = 10$ ms and is divided into two half-frames of 5 ms each. A basic time unit for NR is $T_c = 1/(\Delta f_{max} * N_f)$ where $\Delta f_{max} = 480 * 10^3$ Hz and $N_f = 4096$. For reference, a basic time unit for LTE is $T_s = 1/(\Delta f_{ref} * N_{f,ref})$ where $\Delta f_{ref} = 15 * 10^3$ Hz and $N_{f,ref} = 2048$. $T_c$ and $T_f$ have the relationship of a constant $\kappa = T_s/T_c = 64$. Each half-frame includes 5 subframes and a duration $T_s$ (of a single subframe is 1 ms. Subframes are further divided into slots and the number of slots in a subframe depends on a subcarrier spacing. Each slot includes 14 or 12 OFDM symbols based on a cyclic prefix. In a normal CP, each slot includes 14 OFDM symbols and, in an extended CP, each slot includes 12 OFDM symbols. The numerology depends on an exponentially scalable subcarrier spacing $\Delta f = 2^u * 15$ kHz. The table below shows the number of OFDM symbols ($N^{slot}_{symb}$) per slot, the number of slots ($N^{frame,u}_{slot}$) per frame, and the number of slots ($N^{subframe,u}_{slot}$) per subframe.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The table below shows the number of OFDM symbols per slot, the number of slots per frame, and the number of slots per subframe, according to the subcarrier spacing $\Delta f = 2^u * 15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

For a subcarrier spacing configuration u, slots may be indexed within a subframe in ascending order as follows: $n^u_s \in \{0, \ldots, n^{subframe,u}_{slot}-1\}$ and indexed within a frame in ascending order as follows: $n^u_{s,f} \in \{0, \ldots, n^{frame,u}_{slot}-1\}$.

Figure 5:
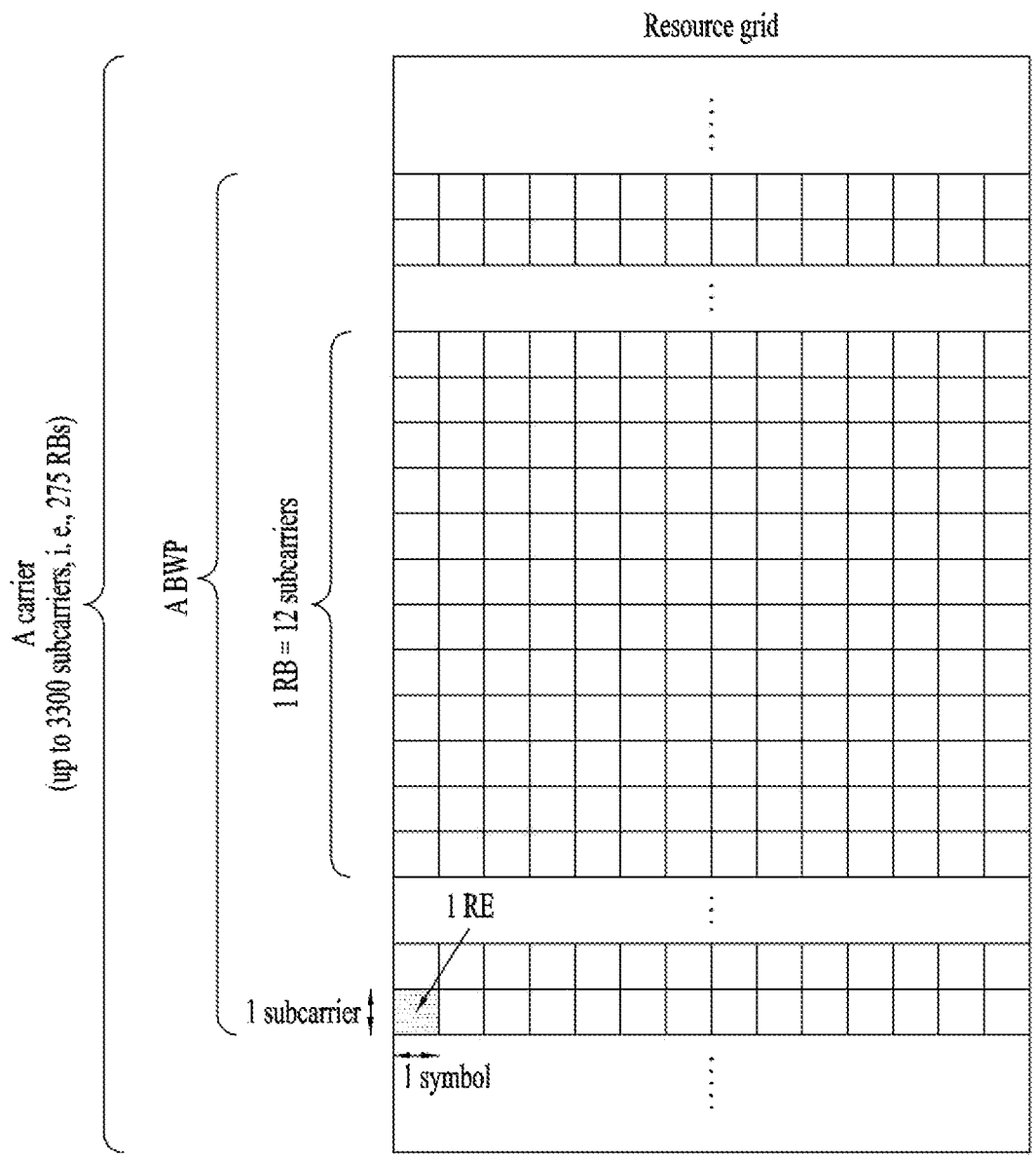
FIG. 5 illustrates a resource grid of a slot.

FIG. 5 illustrates a resource grid of a slot. The slot includes multiple (e.g., 14 or 12) symbols in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at a common resource block (CRB) $N^{start,u}_{grid}$ indicated by higher layer signaling (e.g. RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP-based wireless communication system, $N^{RB}_{sc}$ is typically 12. There is one resource grid for a given antenna port p, a subcarrier spacing configuration u, and a transmission link (DL or UL). The carrier bandwidth $N^{size,u}_{grid}$ for the subcarrier spacing configuration u is given to the UE by a higher layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index 1 representing a symbol location relative to a reference point in the time domain. In the NR system, an RB is defined by 12 consecutive subcarriers in the frequency domain. In the NR system, RBs are classified into CRBs and physical resource blocks (PRBs). The CRBs are numbered from 0 upwards in the frequency domain for the subcarrier spacing configuration u. The center of subcarrier 0 of CRB 0 for the subcarrier spacing configuration u is equal to 'Point A' which serves as a common reference point for RB grids. The PRBs for subcarrier spacing configuration u are defined within a bandwidth part (BWP) and numbered from 0 to $N^{size,u}_{BWP,i}-1$, where i is a number of the BWP. The relation between a PRB $n^u_{PRB}$ in a BWP i and a CRB $n^u_{CRB}$ is given by: $n^u_{PRB} = n^u_{CRB} + N^{size,u}_{BWP,i}$, where $N^{size}_{BWP,i}$ is a CRB in which the BWP starts relative to CRB 0. The BWP includes a plurality of consecutive RBs in the frequency domain. For example, the BWP may be a subset of contiguous CRBs defined for a given numerology $u_i$ in the BWP i on a given carrier. A carrier may include a maximum of N (e.g., 5) BWPs. The UE may be configured to have one or more BWPs on a given component carrier. Data communication is performed through an activated BWP and only a predetermined number of BWPs (e.g., one BWP) among BWPs configured for the UE may be active on the component carrier.

For each serving cell in a set of DL BWPs or UL BWPs, the network may configure at least an initial DL BWP and one (if the serving cell is configured with uplink) or two (if supplementary uplink is used) initial UL BWPs. The network may configure additional UL and DL BWPs. For each DL BWP or UL BWP, the UE may be provided the following parameters for the serving cell: i) an SCS; ii) a CP; iii) a CRB $N^{start}_{BWP}=O_{carrier}+RB_{start}$ and the number of contiguous RBs $N^{size}_{BWP}=L_{RB}$ provided by an RRC parameter locationAndBandwidth, which indicates an offset $RB_{set}$ and a length $L_{RB}$ as a resource indicator value (RIV) on the assumption of $N^{start}_{BWP}=275$, and a value $O_{carrier}$ provided by an RRC parameter offsetToCarrier for the SCS; an index in the set of DL BWPs or UL BWPs; a set of BWP-common parameters; and a set of BWP-dedicated parameters.

Virtual resource blocks (VRBs) may be defined within the BWP and indexed from 0 to where i denotes a BWP number. The VRBs may be mapped to PRBs according to non-interleaved mapping. In some implementations, VRB n may be mapped to PRB n for non-interleaved VRB-to-PRB mapping.

Figure 6:
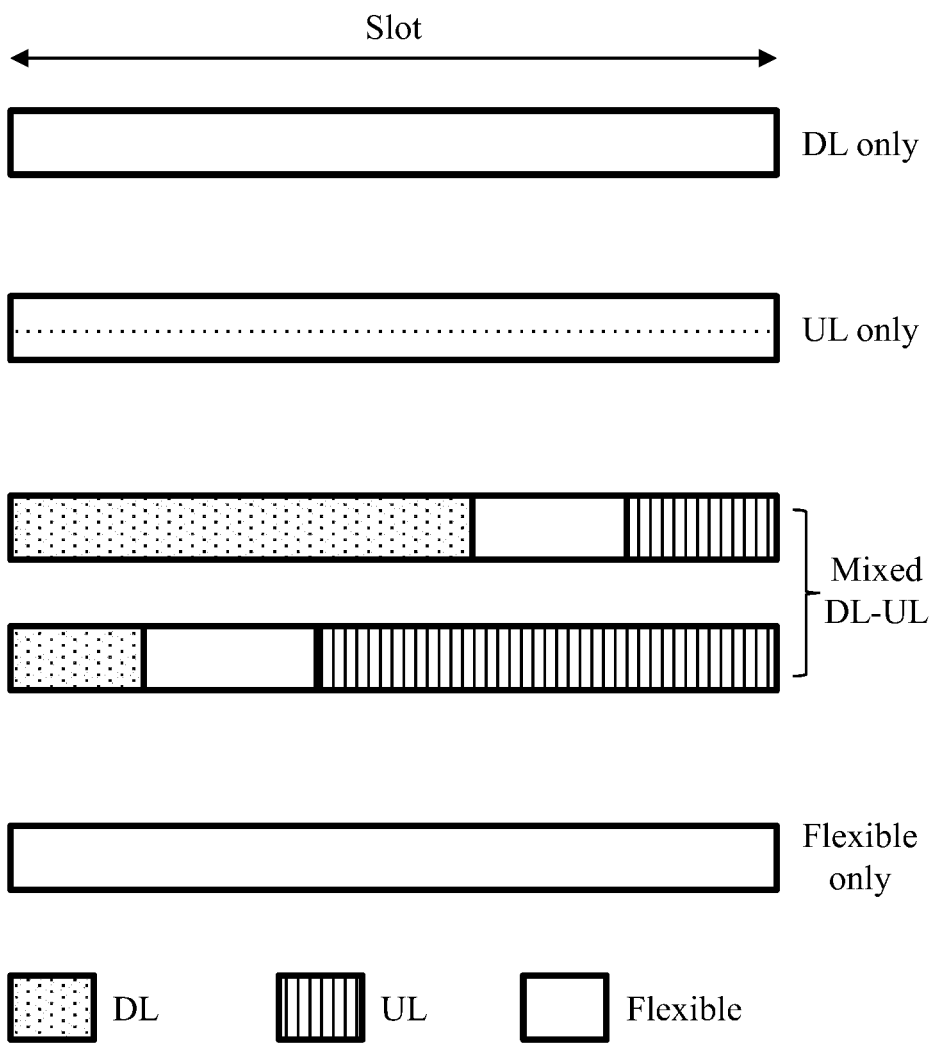
FIG. 6 illustrates slot structures used in a 3GPP-based system.

FIG. 6 illustrates slot structures used in a 3GPP-based system. In all 3GPP-based systems, for example, in an NR system, each slot may have a self-contained structure including i) a DL control channel, ii) DL or UL data, and/or iii) a UL control channel. For example, the first N symbols in a slot may be used to transmit the DL control channel (hereinafter, DL control region) and the last M symbols in a slot may be used to transmit the UL control channel (hereinafter, UL control region), where N and M are integers other than negative numbers. A resource region (hereinafter, data region) between the DL control region and the UL control region may be used to transmit DL data or UL data. Symbols in a single slot may be divided into group(s) of consecutive symbols that may be used as DL symbols, UL symbols, or flexible symbols. Hereinbelow, information indicating how each symbol in slot(s) is used will be referred to as a slot format. For example, which symbols in slot(s) are used for UL and which symbols in slot(s) are used for DL may be defined by a slot format.

When a BS intends to operate a serving cell in time division duplex (TDD) mode, the BS may configure a pattern for UL and DL allocation for the serving cell through higher layer (e.g., RRC) signaling. For example, the following parameters may be used to configure a TDD DL-UL pattern:
   dl-UL-TransmissionPeriodicity that provides a periodicity of the DL-UL pattern;
   nrofDownlinkSlots that provides the number of consecutive full DL slots at the beginning of each DL-UL pattern, where the full DL slots are slots having only DL symbols;
   nrofDownlinkSymbols that provides the number of consecutive DL symbols at the beginning of a slot immediately following the last full DL slot;
   nrofUplinkSlots that provides the number of consecutive full UL slots at the end of each DL-UL pattern, where the full UL slots are slots having only UL symbols; and
   nrofUplinkSymbols that provides the number of consecutive UL symbols in the end of a slot immediately preceding the first full UL slot.

The remaining symbols that are not configured as either DL symbols or UL symbols among symbols in the DL-UL pattern are flexible symbols.

If the UE is provided with a configuration for the TDD DL-UL pattern, i.e., a TDD UL-DL configuration (e.g., tdd-UL-DL-ConfigurationCommon, or tdd-UL-DLConfigurationDedicated), through higher layer signaling, the UE sets a slot format per slot over a number of slots based on the configuration.

For symbols, although there may be various combinations of DL symbols, UL symbols, and flexible symbols, a predetermined number of combinations may be predefined as slot formats and the predefined slot formats may be respectively identified by slot format indexes. The following table shows a part of the predefined slot formats. In the table below, D denotes a DL symbol, U denotes a UL symbol, and F denotes a flexible symbol.

TABLE 3

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | F | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |

To indicate which slot format is used in a specific slot among the predefined slot formats, the BS may configure a set of slot format combinations applicable to a corresponding serving cell per cell with respect to a set of serving cells through higher layer (e.g., RRC) signaling and cause the UE to monitor a group-common PDCCH for slot format indicator(s) (SFI(s)) through higher layer (e.g., RRC) signaling. Hereinafter, DCI carried by the group-common PDCCH for the SFI(s) will be referred to as SFI DCI. DCI format 2_0 is used as the SFI DCI. For example, for each serving cell in a set of serving cells, the BS may provide the UE with the (start) position of a slot format combination ID (i.e., SFI-index) for a corresponding serving cell in the SFI DCI, a set of slot format combinations applicable to the serving cell, and a reference subcarrier spacing configuration for each slot format in a slot format combination indicated by an SFI-index value in the SFI DCI. One or more slot formats are configured for each slot format combination in the set of the slot format combinations and the slot format combination ID (i.e., SFI-index) is assigned to the slot format combination. For example, when the BS intends to configure the slot format combination with N slot formats, N slot format indexes among slot format indexes for the predefined slot formats (e.g., see Table 3) may be indicated for the slot format combination. In order to configure the UE to monitor the group-common PDCCH for the SFIs, the BS informs the UE of an SFI-RNTI corresponding to an RNTI used for an SFI and the total length of a DCI payload scrambled with the SFI-RNTI. Upon detecting the PDCCH based on the SFI-RNTI, the UE may determine slot format(s) for the corresponding serving cell from an SFI-index for the serving cell among SFI-indexes in the DCI payload in the PDCCH.

Symbols indicated as flexible symbols by the TDD DL-UL pattern configuration may be indicated as UL symbols, DL symbols, or flexible symbols by the SFI DCI. Symbols indicated as the DL/UL symbols by the TDD DL-UL pattern configuration are not overridden as the UL/DL symbols or the flexible symbols by the SFI DCI.

If the TDD DL-UL pattern is not configured, the UE determines whether each slot is used for UL or DL and determines symbol allocation in each slot based on the SFI DCI and/or on DCI for scheduling or triggering DL or UL signal transmission (e.g., DCI format 1_0, DCI format 1_1, DCI format 1_2, DCI format 0_0, DCI format 0_1, DCI format 0_2, or DCI format 2_3).

The UE for which carrier aggregation is configured may be configured to use one or more cells. If the UE is configured with a plurality of serving cells, the UE may be configured with one or multiple cell groups. The UE may also be configured with a plurality of cell groups associated with different BSs. Alternatively, the UE may be configured with a plurality of cell groups associated with a single BS. Each cell group of the UE includes one or more serving cells and includes a single PUCCH cell for which PUCCH resources are configured. The PUCCH cell may be a Pcell or an Scell configured as the PUCCH cell among Scells of a corresponding cell group. Each serving cell of the UE belongs to one of cell groups of the UE and does not belong to a plurality of cells.

NR frequency bands are defined as two types of frequency ranges, i.e., FR1 and FR2. FR2 is also referred to as millimeter wave (mmW). The following table shows frequency ranges within which NR may operate.

TABLE 4

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Hereinafter, physical channels that may be used in the 3GPP-based wireless communication system will be described in detail.

A PDCCH carries DCI. For example, the PDCCH (i.e., DCI) carries information about transport format and resource allocation of a downlink shared channel (DL-SCH), information about resource allocation of an uplink shared channel (UL-SCH), paging information about a paging channel (PCH), system information about the DL-SCH, information about resource allocation for a control message, such as a random access response (RAR) transmitted on a PDSCH, of a layer (hereinafter, higher layer) positioned higher than a physical layer among protocol stacks of the UE/BS, a transmit power control command, information about activation/deactivation of configured scheduling (CS), etc. DCI including resource allocation information on the DL-SCH is called PDSCH scheduling DCI, and DCI including resource allocation information on the UL-SCH is called PUSCH scheduling DCI. The DCI includes a cyclic redundancy check (CRC). The CRC is masked/scrambled with various identifiers (e.g., radio network temporary identifier (RNTI)) according to an owner or usage of the PDCCH. For example, if the PDCCH is for a specific UE, the CRS is masked with a UE identifier (e.g., cell-RNTI (C-RNTI)). If the PDCCH is for a paging message, the CRC is masked with a paging RNTI (P-RNTI). If the PDCCH is for system information (e.g., system information block (SIB)), the CRC is masked with a system information RNTI (SI-RNTI). If the PDCCH is for a random access response, the CRC is masked with a random access-RNTI (RA-RNTI).

When a PDCCH on one serving cell schedules a PDSCH or a PUSCH on another serving cell, it is referred to cross-carrier scheduling. Cross-carrier scheduling with a carrier indicator field (CIF) may allow a PDCCH on a serving cell to schedule resources on another serving cell. When a PDSCH on a serving cell schedules a PDSCH or a PUSCH on the serving cell, it is referred to as self-carrier scheduling. When the cross-carrier scheduling is used in a cell, the BS may provide information about a cell scheduling the cell to the UE. For example, the BS may inform the UE whether a serving cell is scheduled by a PDCCH on another (scheduling) cell or scheduled by the serving cell. If the serving cell is scheduled by the other (scheduling) cell, the BS may inform the UE which cell signals DL assignments and UL grants for the serving cell. In the present disclosure, a cell carrying a PDCCH is referred to as a scheduling cell, and a cell where transmission of a PUSCH or a PDSCH is scheduled by DCI included in the PDCCH, that is, a cell carrying the PUSCH or PDSCH scheduled by the PDCCH is referred to as a scheduled cell.

A PDSCH is a physical layer UL channel for UL data transport. The PDSCH carries DL data (e.g., DL-SCH transport block) and is subjected to modulation such as quadrature phase shift keying (QPSK), 16 quadrature amplitude modulation (QAM), 64 QAM, 256 QAM, etc. A codeword is generated by encoding a transport block (TB). The PDSCH may carry a maximum of two codewords. Scrambling and modulation mapping per codeword may be performed and modulation symbols generated from each codeword may be mapped to one or more layers. Each layer is mapped to a radio resource together with a DMRS and generated as an OFDM symbol signal. Then, the OFDM symbol signal is transmitted through a corresponding antenna port.

A PUCCH means a physical layer UL channel for UCI transmission. The PUCCH carries UCI. The UCI includes the following information.

Scheduling request (SR): Information that is used to request a UL-SCH resource.

Hybrid automatic repeat request (HARQ)—acknowledgment (ACK): A response to a DL data packet (e.g., codeword) on the PDSCH. HARQ-ACK indicates whether the DL data packet has been successfully received by a communication device. In response to a single codeword, 1-bit HARQ-ACK may be transmitted. In response to two codewords, 2-bit HARQ-ACK may be transmitted. The HARQ-ACK response includes positive ACK (simply, ACK), negative ACK (NACK), discontinuous transmission (DTX), or NACK/DTX. Here, the term HARQ-ACK is used interchangeably with HARQ ACK/NACK, ACK/NACK, or A/N.

Channel state information (CSI): Feedback information about a DL channel. The CSI may include channel quality information (CQI), a rank indicator (RI), a precoding matrix indicator (PMI), a CSI-RS resource indicator (CSI), an SS/PBCH resource block indicator (SSBRI), and a layer indicator (L1). The CSI may be classified into CSI part 1 and CSI part 2 according to UCI type included in the CSI. For example, the CRI, RI, and/or the CQI for the first codeword may be included in CSI part 1, and LI, PMI, and/or the CQI for the second codeword may be included in CSI part 2.

In the present disclosure, for convenience, PUCCH resources configured/indicated for/to the UE by the BS for HARQ-ACK, SR, and CSI transmission are referred to as a HARQ-ACK PUCCH resource, an SR PUCCH resource, and a CSI PUCCH resource, respectively.

PUCCH formats may be defined as follows according to UCI payload sizes and/or transmission lengths (e.g., the number of symbols included in PUCCH resources). In regard to the PUCCH formats, reference may also be made to Table 5.

(0) PUCCH Format 0 (PF0 or F0)

Supported UCI payload size: up to K bits (e.g., K=2)

Number of OFDM symbols constituting a single PUCCH: 1 to X symbols (e.g., X=2)

Transmission structure: Only a UCI signal without a DMRS is included in PUCCH format 0. The UE transmits a UCI state by selecting and transmitting one of a plurality of sequences. For example, the UE transmits specific UCI to the BS by transmitting one of a plurality of sequences through a PUCCH, which is PUCCH format 0. The UE transmits the PUCCH, which is PUCCH format 0, in PUCCH resources for a corresponding SR configuration only upon transmitting a positive SR.

Configuration for PUCCH format 0 includes the following parameters for a corresponding PUCCH resource: an index for initial cyclic shift, the number of symbols for PUCCH transmission, and/or the first symbol for PUCCH transmission.

(1) PUCCH format 1 (PF1 or F1)

Supported UCI payload size: up to K bits (e.g., K=2)

Number of OFDM symbols constituting a single PUCCH: Y to Z symbols (e.g., Y=4 and Z=14)

Transmission structure: The DMRS and UCI are configured/mapped in TDM in/to different OFDM symbols. In other words, the DMRS is transmitted in symbols in which modulation symbols are not transmitted and the UCI is represented as the product between a specific sequence (e.g., orthogonal cover code (OCC)) and a modulation (e.g., QPSK) symbol. Code division multiplexing (CDM) is supported between a plurality of PUCCH resources (conforming to PUCCH format 1) (within the same RB) by applying cyclic shifts (CSs)/OCCs to both the UCI and the DMRS. PUCCH format 1 carries the UCI of up to 2 bits and the modulation symbols are spread by the OCC (differently configured depending on whether frequency hopping is performed) in the time domain.

Configuration for PUCCH format 1 includes the following parameters for a corresponding PUCCH resource: an index for initial cyclic shift, the number of symbols for PUCCH transmission, the first symbol for PUCCH transmission, and/or an index for the OCC.

(2) PUCCH Format 2 (PF2 or F2)

Supported UCI payload size: more than K bits (e.g., K=2)

Number of OFDM symbols constituting a single PUCCH: 1 to X symbols (e.g., X=2)

Transmission structure: The DMRS and UCI are configured/mapped using frequency division multiplexing (FDM) within the same symbol. The UE transmits the UCI by applying only IFFT without DFT to encoded UCI bits. PUCCH format 2 carries UCI of a larger bit size than K bits and modulation symbols are subjected to FDM with the DMRS, for transmission. For example, the DMRS is located in symbol indexes #1, #4, #7, and #10 within a given RB with the density of ⅓. A pseudo noise (PN) sequence is used for a DMRS sequence. Frequency hopping may be activated for 2-symbol PUCCH format 2.

Configuration for PUCCH format 2 includes the following parameters for a corresponding PUCCH resource: the number of PRBs, the number of symbols for PUCCH transmission, and/or the first symbol for PUCCH transmission.

(3) PUCCH Format 3 (PF3 or F3)

Supported UCI payload size: more than K bits (e.g., K=2)

Number of OFDM symbols constituting a single PUCCH: Y to Z symbols (e.g., Y=4 and Z=14)

Transmission structure: The DMRS and UCI are configured/mapped in TDM for/to different OFDM symbols. The UE transmits the UCI by applying DFT to encoded UCI bits. PUCCH format 3 does not support UE multiplexing for the same time-frequency resource (e.g., same PRB).

Configuration for PUCCH format 3 includes the following parameters for a corresponding PUCCH resource: the number of PRBs, the number of symbols for PUCCH transmission, and/or the first symbol for PUCCH transmission.

(4) PUCCH Format 4 (PF4 or F4)

Supported UCI payload size: more than K bits (e.g., K=2)

Number of OFDM symbols constituting a single PUCCH: Y to Z symbols (e.g., Y=4 and Z=14)

Transmission structure: The DMRS and UCI are configured/mapped in TDM for/to different OFDM symbols. PUCCH format 4 may multiplex up to 4 UEs in the same PRB, by applying an OCC at the front end of DFT and applying a CS (or interleaved FDM (IFDM) mapping) to the DMRS. In other words, modulation symbols of the UCI are subjected to TDM with the DMRS, for transmission.

Configuration for PUCCH format 4 includes the following parameters for a corresponding PUCCH resource: the number of symbols for PUCCH transmission, length for the OCC, an index for the OCC, and the first symbol for PUCCH transmission.

The table below shows the PUCCH formats. The PUCCH formats may be divided into short PUCCH formats (formats 0 and 2) and long PUCCH formats (formats 1, 3, and 4) according to PUCCH transmission length.

TABLE 5

| PUCCH format | Length in OFDM symbols $N^{PUCCH}_{symb}$ | Number of bits | Usage | Etc. |
|---|---|---|---|---|
| 0 | 1-2 | =<2 | HARQ, SR | Sequence selection |
| 1 | 4-14 | =<2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM(no UE multiplexing) |
| 4 | 4-14 | >2 | HARQ, CSI, [SR] | DFT-s-OFDM(Pre DFT OCC) |

A PUCCH resource may be determined according to a UCI type (e.g., A/N, SR, or CSI). A PUCCH resource used for UCI transmission may be determined based on a UCI (payload) size. For example, the BS may configure a plurality of PUCCH resource sets for the UE, and the UE may select a specific PUCCH resource set corresponding to a specific range according to the range of the UCI (payload) size (e.g., numbers of UCI bits). For example, the UE may select one of the following PUCCH resource sets according to the number of UCI bits, NUCI.—PUCCH resource set #0, if the number of UCI bits=<2

PUCCH resource set #1, if 2<the number of UCI bits=<N1
. . .
PUCCH resource set #(K−1), if NK-2<the number of UCI bits=<NK−1

Here, K represents the number of PUCCH resource sets (K>1) and $N_i$ represents a maximum number of UCI bits supported by PUCCH resource set #i. For example, PUCCH resource set #1 may include resources of PUCCH formats 0 to 1, and the other PUCCH resource sets may include resources of PUCCH formats 2 to 4 (see Table 6).

Configuration for each PUCCH resource includes a PUCCH resource index, a start PRB index, and configuration for one of PUCCH format 0 to PUCCH format 4. The UE is configured with a code rate for multiplexing HARQ-ACK, SR, and CSI report(s) within PUCCH transmission using PUCCH format 2, PUCCH format 3, or PUCCH format 4, by the BS through a higher layer parameter maxCodeRate. The higher layer parameter maxCodeRate is used to determine how to feed back the UCI on PUCCH resources for PUCCH format 2, 3, or 4.

If the UCI type is SR and CSI, a PUCCH resource to be used for UCI transmission in a PUCCH resource set may be configured for the UE through higher layer signaling (e.g., RRC signaling). If the UCI type is HARQ-ACK for a semi-persistent scheduling (SPS) PDSCH, the PUCCH resource to be used for UCI transmission in the PUCCH resource set may be configured for the UE through higher layer signaling (e.g., RRC signaling). On the other hand, if the UCI type is HARQ-ACK for a PDSCH scheduled by DCI, the PUCCH resource to be used for UCI transmission in the PUCCH resource set may be scheduled by the DCI.

In the case of DCI-based PUCCH resource scheduling, the BS may transmit the DCI to the UE on a PDCCH and indicate a PUCCH resource to be used for UCI transmission in a specific PUCCH resource set by an ACK/NACK resource indicator (ARI) in the DCI. The ARI may be used to indicate a PUCCH resource for ACK/NACK transmission and also be referred to as a PUCCH resource indicator (PRI). Here, the DCI may be used for PDSCH scheduling and the UCI may include HARQ-ACK for a PDSCH. The BS may configure a PUCCH resource set including a larger number of PUCCH resources than states representable by the ARI by (UE-specific) higher layer (e.g., RRC) signaling for the UE. The ARI may indicate a PUCCH resource subset of the PUCCH resource set and which PUCCH resource in the indicated PUCCH resource subset is to be used may be determined according to an implicit rule based on transmission resource information about the PDCCH (e.g., the starting CCE index of the PDCCH).

For UL-SCH data transmission, the UE should include UL resources available for the UE and, for DL-SCH data reception, the UE should include DL resources available for the UE. The UL resources and the DL resources are assigned to the UE by the BS through resource allocation. Resource allocation may include time domain resource allocation (TDRA) and frequency domain resource allocation (FDRA). In the present disclosure, UL resource allocation is also referred to as a UL grant and DL resource allocation is referred to as DL assignment. The UL grant is dynamically received by the UE on the PDCCH or in RAR or semi-persistently configured for the UE by the BS through RRC signaling. DL assignment is dynamically received by the UE on the PDCCH or semi-persistently configured for the UE by the BS through RRC signaling.

On UL, the BS may dynamically allocate UL resources to the UE through PDCCH(s) addressed to a cell radio network temporary Identifier (C-RNTI). The UE monitors the PDCCH(s) in order to discover possible UL grant(s) for UL transmission. The BS may allocate the UL resources using a configured grant to the UE. Two types of configured grants, Type 1 and Type 2, may be used. In Type 1, the BS directly provides the configured UL grant (including periodicity) through RRC signaling. In Type 2, the BS may configure a periodicity of an RRC-configured UL grant through RRC signaling and signal, activate, or deactivate the configured UL grant through the PDCCH addressed to a configured scheduling RNTI (CS-RNTI). For example, in Type 2, the PDCCH addressed to the CS-RNTI indicates that the corresponding UL grant may be implicitly reused according to the configured periodicity through RRC signaling until deactivation.

On DL, the BS may dynamically allocate DL resources to the UE through PDCCH(s) addressed to the C-RNTI. The UE monitors the PDCCH(s) in order to discover possible DL grant(s). The BS may allocate the DL resources to the UE using SPS. The BS may configure a periodicity of configured DL assignment through RRC signaling and signal, activate, or deactivate the configured DL assignment through the PDCCH addressed to the CS-RNTI. For example, the PDCCH addressed to the CS-RNTI indicates that the corresponding DL assignment may be implicitly reused according to the configured periodicity through RRC signaling until deactivation.

Hereinafter, resource allocation by the PDCCH and resource allocation by RRC will be described in more detail.

Resource Allocation by PDCCH: Dynamic Grant/Assignment

The PDCCH may be used to schedule DL transmission on the PDSCH and UL transmission on the PUSCH. DCI on the PDCCH for scheduling DL transmission may include DL resource assignment that at least includes a modulation and coding format (e.g., modulation and coding scheme (MCS)) index $I_{MCS}$), resource allocation, and HARQ information, associated with a DL-SCH. DCI on the PDCCH for scheduling UL transmission may include a UL scheduling grant that at least includes a modulation and coding format, resource allocation, and HARQ information, associated with a UL-SCH. The size and usage of the DCI carried by one PDCCH differs according to a DCI format. For example, DCI format 0_0, DCI format 0_1, or DCI format 0_2 may be used to schedule the PUSCH, and DCI format 1_0, DCI format 1_1, or DCI format 1_2 may be used to schedule the PDSCH. Particularly, DCI format 0_2 and DCI format 1_2 may be used to schedule transmission having higher transmission reliability and lower latency requirements than transmission reliability and latency requirement guaranteed by DCI format 0_0, DCI format 0_1, DCI format 1_0, or DCI format 1_1. Some implementations of the present disclosure may be applied to UL data transmission based on DCL format 0_2. Some implementations of the present disclosure may be applied to DL data reception based on DCI format 1_2.

Figure 7:
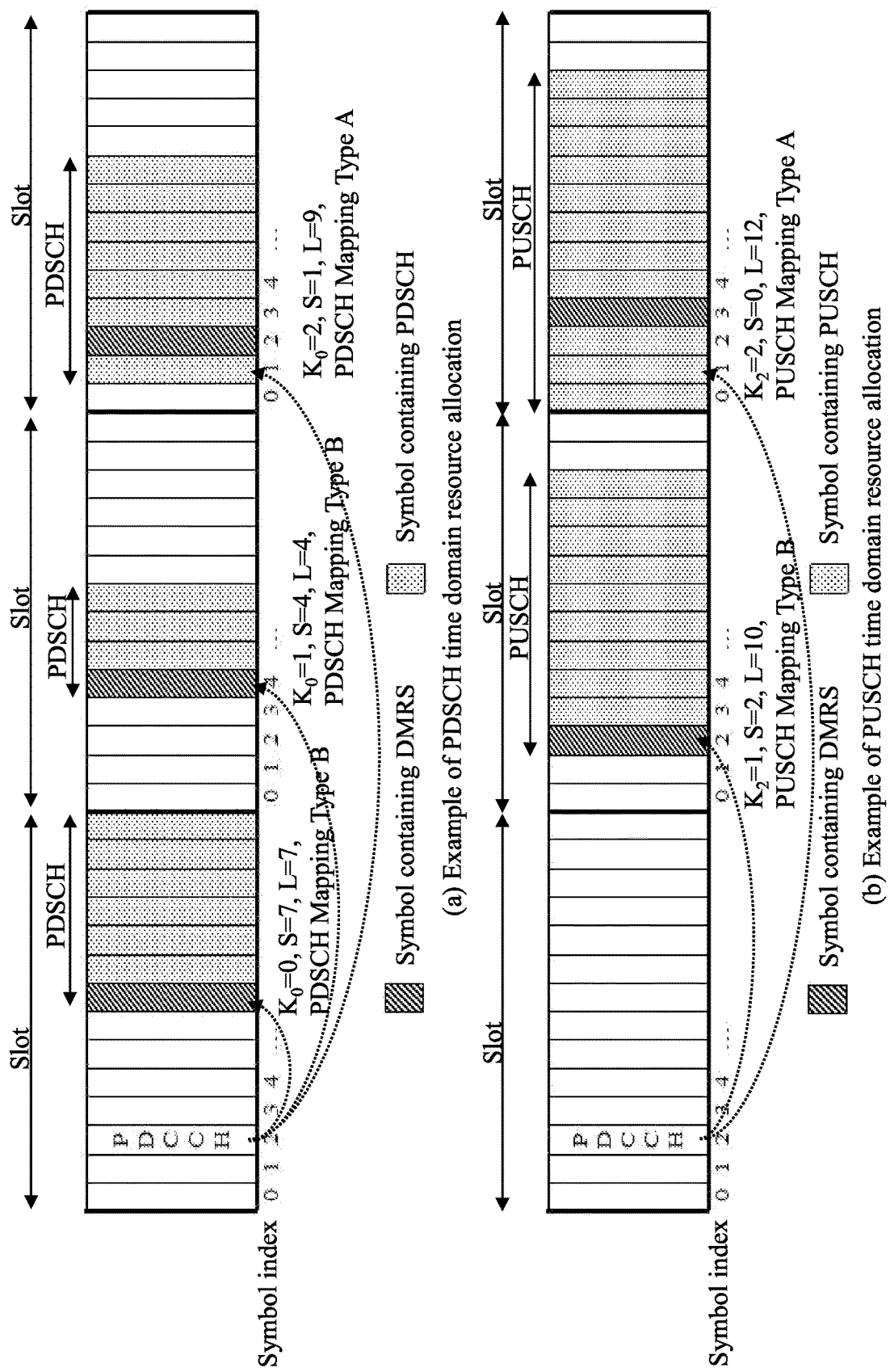
FIG. 7 illustrates an example of physical downlink shared channel (PDSCH) time domain resource assignment (TDRA) caused by a physical downlink control channel (PDCCH) and an example of physical uplink shared channel (PUSCH) TDRA caused by the PDCCH.

FIG. 7 illustrates an example of PDSCH TDRA caused by a PDCCH and an example of PUSCH TDRA caused by the PDCCH.

DCI carried by the PDCCH in order to schedule a PDSCH or a PUSCH includes a TDRA field. The TDRA field provides a value m for a row index m+1 to an allocation table for the PDSCH or the PUSCH. Predefined default PDSCH time domain allocation is applied as the allocation table for the PDSCH or a PDSCH TDRA table that the BS configures through RRC signaled pdsch-TimeDomainAllocationList is applied as the allocation table for the PDSCH. Predefined default PUSCH time domain allocation is applied as the allocation table for the PUSCH or a PUSCH TDRA table that the BS configures through RRC signaled pusch-TimeDomainAllocationList is applied as the allocation table for the PUSCH. The PDSCH TDRA table to be applied and/or the PUSCH TDRA table to be applied may be determined according a fixed/predefined rule (e.g., refer to 3GPP TS 38.214).

In PDSCH time domain resource configurations, each indexed row defines a DL assignment-to-PDSCH slot offset $K_0$, a start and length indicator SLIV (or directly, a start position (e.g., start symbol index S) and an allocation length (e.g., the number of symbols, L) of the PDSCH in a slot), and a PDSCH mapping type. In PUSCH time domain resource configurations, each indexed row defines a UL grant-to-PUSCH slot offset $K_2$, a start position (e.g., start symbol index S) and an allocation length (e.g., the number of symbols, L) of the PUSCH in a slot, and a PUSCH mapping type. $K_0$ for the PDSCH and $K_2$ for the PUSCH indicate the difference between the slot with the PDCCH and the slot with the PDSCH or PUSCH corresponding to the PDCCH. SLIV denotes a joint indicator of the start symbol S relative to the start of the slot with the PDSCH or PUSCH and the number of consecutive symbols, L, counting from the symbol S. There are two PDSCH/PUSCH mapping types: one is mapping type A and the other is mapping type B. In the case of PDSCH/PUSCH mapping type A, a DMRS is mapped to a PDSCH/PUSCH resource with respect to the start of a slot. One or two of the symbols of the PDSCH/PUSCH resource may be used as DMRS symbol(s) according to other DMRS parameters. For example, in the case of PDSCH/PUSCH mapping type A, the DMRS is located in the third symbol (symbol #2) or the fourth symbol (symbol #3) in the slot according to RRC signaling. In the case of PDSCH/PUSCH mapping type B, a DMRS is mapped with respect to the first OFDM symbol of a PDSCH/PUSCH resource. One or two symbols from the first symbol of the PDSCH/PUSCH resource may be used as DMRS symbol(s) according to other DMRS parameters. For example, in the case of PDSCH/PUSCH mapping type B, the DMRS is located at the first symbol allocated for the PDSCH/PUSCH.

In the present disclosure, the PDSCH/PUSCH mapping type may be referred to as a mapping type or a DMRS mapping type. For example, in this specification, PUSCH mapping type A may be referred to as mapping type A or DMRS mapping type A, and PUSCH mapping type B may be referred to as mapping type B or DMRS mapping type B.

The scheduling DCI includes an FDRA field that provides assignment information about RBs used for the PDSCH or the PUSCH. For example, the FDRA field provides information about a cell for PDSCH or PUSCH transmission to the UE, information about a BWP for PDSCH or PUSCH transmission, and/or information about RBs for PDSCH or PUSCH transmission.

Resource Allocation by RRC

As mentioned above, there are two types of transmission without dynamic grant: configured grant Type 1 and configured grant Type 2. In configured grant Type 1, a UL grant is provided by RRC and stored as a configured UL grant. In configured grant Type 2, the UL grant is provided by the PDCCH and stored or cleared as the configured UL grant based on L1 signaling indicating configured UL grant activation or deactivation. Type 1 and Type 2 may be configured by RRC per serving cell and per BWP. Multiple configurations may be active simultaneously on different serving cells.

When configured grant Type 1 is configured, the UE may be provided with the following parameters through RRC signaling:
  cs-RNTI corresponding to a CS-RNTI for retransmission;
  periodicity corresponding to a periodicity of configured grant Type 1;
  timeDomainOffset indicating an offset of a resource with respect to system frame number (SFN)=0 in the time domain;
  timeDomainAllocation value m that provides a row index m+1 pointing to the allocation table, indicating a combination of the start symbol S, the length L, and the PUSCH mapping type;
  frequencyDomainAllocation that provides frequency domain resource allocation; and
  mcsAndTBS that provides $I_{MCS}$ indicating a modulation order, a target code rate, and a transport block size.

Upon configuration of configured grant Type 1 for a serving cell by RRC, the UE stores the UL grant provided by RRC as a configured UL grant for an indicated serving cell and initializes or re-initializes the configured UL grant to start in a symbol according to timeDomainOffset and S (derived from SLIV) and to recur with periodicity. After the UL grant is configured for configured grant Type 1, the UE may consider that the UL grant recurs in association with each symbol satisfying: [(SFN*numberOfSlotsPerFrame (numberOfSymbolsPerSlot)+(slot number in the frame*numberOfSymbolsPerSlot)+symbol number in the slot]=(timeDomainOffset*numberOfSymbolsPerSlot+S+N*periodicity) modulo (1024*numberOfSlotsPerFrame*numberOfSymbolsPerSlot), for all N>=0, where numberOfSlotsPerFrame and numberOfSymbolsPerSlot indicate the number of consecutive slots per frame and the number of consecutive OFDM symbols per slot, respectively (refer to Table 1 and Table 2).

For configured grant Type 2, the UE may be provided with the following parameters by the BS through RRC signaling:
  cs-RNTI corresponding to a CS-RNTI for activation, deactivation, and retransmission; and
  periodicity that provides a periodicity of configured grant Type 2.

An actual UL grant is provided to the UE by the PDCCH (addressed to the CS-RNTI). After the UL grant is configured for configured grant Type 2, the UE may consider that the UL grant recurs in association with each symbol satisfying:
[(SFN*numberOfSlotsPerFrame*numberOfSymbolsPerSlot)+(slot number in the frame*numberOfSymbolsPerSlot)+symbol number in the slot]= [(SFN$_{start\ time}$*numberOfSlotsPerFrame*numberOfSymbolsPerSlot+slot$_{start\ time}$*numberOfSymbolsPerSlot+symbol$_{start\ time}$) N*periodicity] modulo (1024*numberOfSlotsPerFrame*numberOfSymbolsPerSlot), for all N>=0, where SFN$_{start\ time}$, slot$_{start\ time}$, and symbol$_{start\ time}$ represent an SFN, a slot, and a symbol, respectively, of the first transmission opportunity of the PUSCH after the configured grant is (re-)initialized, and numberOfSlotsPerFrame and numberOfSymbolsPerSlot indicate the number of consecutive slots per frame and the number of consecutive OFDM symbols per slot, respectively (refer to Table 1 and Table 2).

On DL, the UE may be configured with semi-persistent scheduling (SPS) per serving cell and per BWP by RRC signaling from the BS. For DL SPS, DL assignment is provided to the UE by the PDCCH and stored or cleared based on L1 signaling indicating SPS activation or deactivation. When SPS is configured, the UE may be provided with the following parameters by the BS through RRC signaling:

cs-RNTI corresponding to a CS-RNTI for activation, deactivation, and retransmission;

nrofHARQ-Processes that provides the number of HARQ processes for SPS;

periodicity that provides a periodicity of configured DL assignment for SPS.

After DL assignment is configured for SPS, the UE may consider sequentially that N-th DL assignment occurs in a slot satisfying: (numberOfSlotsPerFrame*SFN+slot number in the frame)=[(numberOfSlotsPerFrame*SFN$_{start\ time}$+slot$_{start\ time}$) N*periodicity*numberOfSlotsPerFrame/10] modulo (1024*numberOfSlotsPerFrame), where SFN$_{start\ time}$ and slot$_{start\ time}$ represent an SFN and a slot, respectively, of first transmission of the PDSCH after configured DL assignment is (re-)initialized, and numberOfSlotsPerFrame and numberOfSymbolsPerSlot indicate the number of consecutive slots per frame and the number of consecutive OFDM symbols per slot, respectively (refer to Table 1 and Table 2).

If the CRC of a corresponding DCI format is scrambled with the CS-RNTI provided by the RRC parameter cs-RNTI, and a new data indicator field for an enabled transport block is set to 0, the UE validates, for scheduling activation or scheduling release, a DL SPS assignment PDCCH or a configured UL grant Type 2 PDCCH. Validation of the DCI format is achieved if all fields for the DCI format are set according to Table 7 and Table 8. Table 7 shows an example of special fields for DL SPS and UL grant Type 2 scheduling activation PDCCH validation, and Table 8 shows an example of special fields for DL SPS and UL grant Type 2 scheduling release PDCCH validation.

TABLE 6

| | DCI format 0_0/0_1 | DCI format 1_0 | DCI format 1_1 |
|---|---|---|---|
| HARQ process number | set to all '0's | set to all '0's | set to all '0's |
| Redundancy version | set to '00' | set to '00' | For the enabled transport block: set to '00' |

TABLE 7

| | DCI format 0_0 | DCI format 1_0 |
|---|---|---|
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

Actual DL assignment and UL grant for DL SPS or UL grant Type 2, and a corresponding MCS are provided by resource assignment fields (e.g., a TDRA field providing a TDRA value m, an FDRA field providing frequency resource block assignment, and/or an MCS field) in the DCI format carried by a corresponding DL SPS or UL grant Type 2 scheduling activation PDCCH. If validation is achieved, the UE considers information in the DCI format as valid activation or valid release of DL SPS or configured UL grant Type 2.

Figure 8:
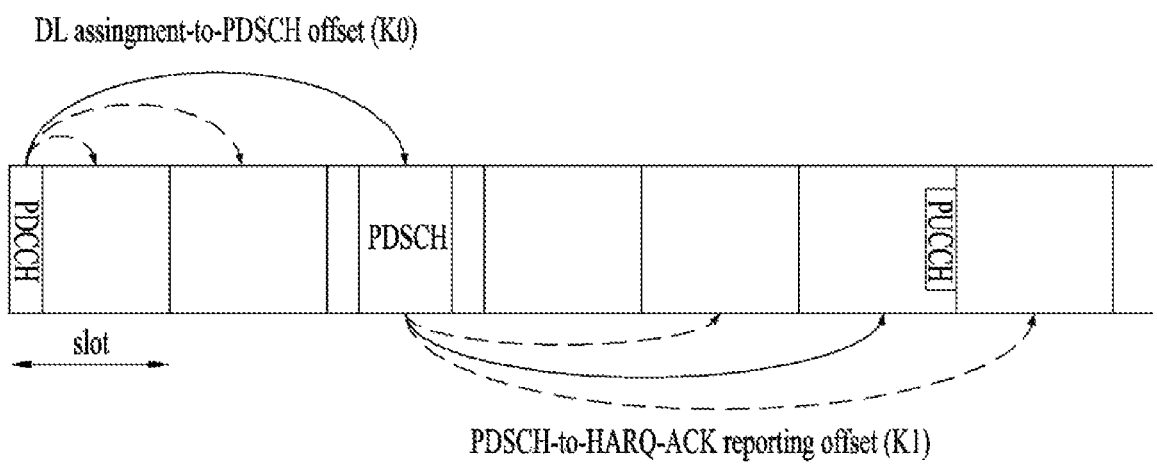
FIG. 8 illustrates a hybrid automatic repeat request-acknowledgement (HARQ-ACK) transmission/reception procedure.

FIG. 8 illustrates a HARQ-ACK transmission/reception procedure.

Referring to FIG. 8, the UE may detect a PDCCH in a slot n. Next, the UE may receive a PDSCH in a slot n+K0 according to scheduling information received through the PDCCH in the slot n and then transmit UCI through a PUCCH in a slot n+K1. In this case, the UCI includes a HARQ-ACK response for the PDSCH.

The DCI (e.g., DCI format 1_0 or DCI format 1_1) carried by the PDCCH for scheduling the PDSCH may include the following information.

FDRA: FDRA indicates an RB set allocated to the PDSCH.

TDRA: TDRA indicates a DL assignment-to-PDSCH slot offset K0, the start position (e.g., symbol index S) and length (e.g., the number of symbols, L) of the PDSCH in a slot, and the PDSCH mapping type. PDSCH mapping Type A or PDSCH mapping Type B may be indicated by TDRA. For PDSCH mapping Type A, the DMRS is located in the third symbol (symbol #2) or fourth symbol (symbol #3) in a slot. For PDSCH mapping Type B, the DMRS is allocated in the first symbol allocated for the PDSCH.

PDSCH-to-HARQ_feedback timing indicator: This indicator indicates K1.

If the PDSCH is configured to transmit a maximum of one TB, a HARQ-ACK response may consist of one bit. If the PDSCH is configured to transmit a maximum of 2 TBs, the HARQ-ACK response may consist of 2 bits when spatial bundling is not configured and one bit when spatial bundling is configured. When a HARQ-ACK transmission timing for a plurality of PDSCHs is designated as slot n+K1, UCI transmitted in slot n+K1 includes a HARQ-ACK response for the plural PDSCHs.

In the present disclosure, a HARQ-ACK payload consisting of HARQ-ACK bit(s) for one or plural PDSCHs may be referred to as a HARQ-ACK codebook. The HARQ-ACK codebook may be categorized as a semi-static HARQ-ACK codebook and a dynamic HARQ-ACK codebook according to a HARQ-ACK payload determination scheme.

In the case of the semi-static HARQ-ACK codebook, parameters related to a HARQ-ACK payload size that the UE is to report are semi-statically determined by a (UE-specific) higher layer (e.g., RRC) signal. The HARQ-ACK payload size of the semi-static HARQ-ACK codebook, e.g., the (maximum) HARQ-ACK payload (size) transmitted through one PUCCH in one slot, may be determined based on the number of HARQ-ACK bits corresponding to a combination (hereinafter, bundling window) of all DL carriers (i.e., DL serving cells) configured for the UE and all DL scheduling slots (or PDSCH transmission slots or PDCCH monitoring slots) for which the HARQ-ACK transmission timing may be indicated. That is, in a semi-static HARQ-ACK codebook scheme, the size of the HARQ-ACK codebook is fixed (to a maximum value) regardless of the number of actually scheduled DL data. For example, DL grant DCI (PDCCH) includes PDSCH-to-HARQ-ACK timing information, and the PDSCH-to-HARQ-ACK timing information may have one (e.g., k) of a plurality of values. For example, when the PDSCH is received in slot #m and the PDSCH-to-HARQ-ACK timing information in the DL grant DCI (PDCCH) for scheduling the PDSCH indicates k, the HARQ-ACK information for the PDSCH may be transmitted in slot #(m+k). As an example, $k \in \{1, 2, 3, 4, 5, 6, 7, 8\}$. When the HARQ-ACK information is transmitted in slot #n, the HARQ-ACK information may include possible maximum HARQ-ACK based on the bundling window. That is, HARQ-ACK information of slot #n may include HARQ-ACK corresponding to slot #(n−k). For example, when $k \in \{1, 2, 3, 4, 5, 6, 7, 8\}$, the HARQ-ACK information of slot #n may include HARQ-ACK corresponding to slot #(n−8) to slot #(n−1) regardless of actual DL data reception (i.e., HARQ-ACK of a maximum number). Here, the HARQ-ACK information may be replaced with a HARQ-ACK codebook or a HARQ-ACK payload. A slot may be understood/replaced as/with a candidate occasion for DL data reception. As described in the example, the bundling window may be determined based on the PDSCH-to-HARQ-ACK timing based on a HARQ-ACK slot, and a PDSCH-to-HARQ-ACK timing set may have predefined values (e.g., $\{1, 2, 3, 4, 5, 6, 7, 8\}$) or may be configured by higher layer (RRC) signaling. In the case of the dynamic HARQ-ACK codebook, the HARQ-ACK payload size that the UE is to report may be dynamically changed by the DCI etc. In the dynamic HARQ-ACK codebook scheme, DL scheduling DCI may include a counter-DAI (i.e., c-DAI) and/or a total-DAI (i.e., t-DAI). Here, the DAI indicates a downlink assignment index and is used for the BS to inform the UE of transmitted or scheduled PDSCH(s) for which HARQ-ACK(s) are to be included in one HARQ-ACK transmission. Particularly, the c-DAI is an index indicating order between PDCCHs carrying DL scheduling DCI (hereinafter, DL scheduling PDCCHs), and t-DAI is an index indicating the total number of DL scheduling PDCCHs up to a current slot in which a PDCCH with the t-DAI is present.

In the NR system, a method of implementing a plurality of logical networks in a single physical network is considered. The logical networks need to support services with various requirements (e.g., eMBB, mMTC, URLLC, etc.). Accordingly, a physical layer of NR is designed to support a flexible transmission structure in consideration of the various service requirements. As an example, the physical layer of NR may change, if necessary, an OFDM symbol length (OFDM symbol duration) and a subcarrier spacing (SCS) (hereinafter, OFDM numerology). Transmission resources of physical channels may also be changed in a predetermined range (in units of symbols). For example, in NR, a PUCCH (resource) and a PUSCH (resource) may be configured to flexibly have a transmission length/transmission start timing within a predetermined range.

A PDCCH is transmitted through a control resource set (CORESET). One or more CORESETs may be configured for the UE. The CORESET consists of a set of PRBs with a duration of 1 to 3 OFDM symbols. The PRBs and a CORESET duration that constitute the CORESET may be provided to the UE through higher layer (e.g., RRC) signaling. A set of PDCCH candidates in the configured CORESET(s) is monitored according to corresponding search space sets. In the present disclosure, monitoring implies decoding (called blind decoding) each PDCCH candidate according to monitored DCI formats. A master information block (MIB) on a PBCH provides parameters (e.g., CORESET #0 configuration) for monitoring a PDCCH for scheduling a PDSCH carrying system information block 1 (SIB1) to the UE. The PBCH may also indicate that there is no associated SIB1. In this case, the UE may be provided with not only a frequency range in which the UE may assume that there is no SSB associated with SSB1 but also other frequencies to search for an SSB associated with SIB1. CORESET #0, which is a CORESET for scheduling SIB1 at least, may be configured by the MIB or dedicated RRC signaling.

A set of PDCCH candidates monitored by the UE is defined in terms of PDCCH search space sets. The search space set may be a common search space (CS S) set or a UE-specific search space (USS) set. Each CORESET configuration is associated with one or more search space sets, and each search space set is associated with one CORESET configuration. The search space set is determined based on the following parameters provided by the BS to the UE.

controlResourceSetId: an identifier for identifying a CORESET p associated with a search space set s.

monitoringSlotPeriodicityAndOffset: a PDCCH monitoring periodicity of slots $k_s$ and a PDCCH monitoring offset of $o_s$ slots to configure slots for PDCCH monitoring.

duration: a duration of $T_s < k_s$ slots indicating a number of slots in which the search space set s exists.

monitoringSymbolsWithinSlot: a PDCCH monitoring pattern within a slot, indicating first symbol(s) of the CORESET within a slot for PDCCH monitoring.

nrofCandidates: a number of PDCCH candidates per CCE aggregation level.

searchSpaceType: an indication that search space set s is either a CCE set or a USS set.

The parameter monitoringSymbolsWithinSlot may indicate the first symbol(s) for PDCCH monitoring in the slots configured for PDCCH monitoring (e.g., see monitoringSlotPeriodicityAndOffset and duration). For example, if monitoringSymbolsWithinSlot is configured with 14 bits, the most significant (left) bit represents the first OFDM symbol of a slot, and the second most significant (left) bit represents the second OFDM symbol of the slot. In this way, the bits of monitoringSymbolsWithinSlot may represent 14 OFDM symbols of the slot, respectively. For example, among the bits of monitoringSymbolsWithinSlot, bit(s) set to 1 may identify the first symbol(s) of a CORESET in a slot.

A UE monitors PDCCH candidates in PDCCH monitoring occasions only. The UE determines a monitoring occasion on an active DL BWP from the PDCCH monitoring periodicity, the PDCCH monitoring offset, and the PDCCH monitoring pattern within a slot. In some implementations, for search space set s, the UE determines that a PDCCH monitoring occasion(s) existing in a slot with number $n^u_{s,f}$ in a frame with number $n_f$ if $(n_f * N^{frame,u}_{slot} + n^u_{s,f} - o_s)$ mod $k_s=0$. The UE monitors PDCCH candidates for search space set s for $T_s$ consecutive slots, starting from slot $n^u_{s,f}$, and does not monitor PDCCH candidates for search space set s for the next $k_s-T_s$.

The following table shows search space sets, related RNTIs, and use cases thereof.

TABLE 8

| Search Space Set | RNTI | Use Case |
| --- | --- | --- |
| Type0-PDCCH CSS set | SI-RNTI on a primary cell | SIB Decoding |
| Type0A-PDCCH CSS set | SI-RNTI on a primary cell | SIB Decoding |
| Type1-PDCCH CSS set | RA-RNTI or TC-RNTI on a primary cell | Msg2, Msg4 decoding in RACH |
| Type2-PDCCH CSS set | P-RNTI on a primary cell | Paging Decoding |
| Type3-PDCCH CSS set | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| USS set | C-RNTI, or MCS-C-RNTI, or CS-RNTI(s) | User specific PDSCH decoding |

The following table shows DCI formats carried by a PDCCH.

TABLE 9

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of PRB(s) and OFDM symbol(s) where UE cancels the corresponding UL transmission from the UE |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. For a CSS, DCI format 0_0 and DCI format 1_0 have fixed sizes after the BWP size is initially given by RRC. For a USS, DCI format 0_0 and DCI format 1_0 are fixed in size in fields other than a frequency domain resource assignment (FDRA) field, and the FDRA field may vary in size by configuration of a related parameter by the BS. In DCI format 0_1 and DCI format 1_1, the size of the DCI field may be changed by various RRC reconfigurations by the BS. DCI format 2_0 may be used to provide dynamic slot format information (e.g., SFI DCI) to the UE, DCI format 2_1 may be used to provide DL pre-emption information to the UE, and DCI format 2_4 may be used to indicate a UL resource on which the UE needs to cancel UL transmission.

For example, each of DCI format 0_0 and DCI format 0_1 may include an FDRA field for scheduling a PUSCH, and each of DCI format 1_0 and DCI format 1_1 may include an FDRA field for scheduling a PDSCH. The number of bits in the FDRA field of each of DCI format 0_0 and DCI format 0_1 may be determined based on $N_{RB}^{UL,BWP}$, which is the size of an active or initial UL BWP. The number of bits in the FDRA field of each of DCI format 1_0 and DCI format 1_1 may be determined based on $N_{RB}^{DL,BWP}$, which is the size of an active or initial DL BWP.

One of the representative scenarios of the next system, URLLC has the low-latency and high-reliability requirements of a user-plane delay of 0.5 ms and transmission of X bytes of data within 1 ms at or below an error rate of $10^{-5}$. In general, eMBB is characterized by a large traffic capacity, a file size equal to or less than tens to hundreds of bytes, and sporadic occurrence. Therefore, eMBB requires transmission at a maximum transmission rate with minimum overhead of control information, whereas URLLC requires a relatively short transmission duration (e.g., 2 symbols) and a reliable transmission method.

Depending on application fields or traffic types, various reference time units may be assumed/used to transmit/receive a physical channel. A reference time may be a basic unit for scheduling a specific physical channel, and a reference time unit may be changed according to the number of symbols and/or a subcarrier spacing (SCS) in the scheduling time unit. Some embodiments/implementations of the present disclosure are described in the context of a slot or mini-slot as a reference time unit, for convenience of description. A slot may be, for example, a basic scheduling unit used for general data traffic (e.g., eMBB). A mini-slot may have a shorter duration than a slot in the time domain, and may be a scheduling basic unit used for a special purpose or for a special communication scheme (e.g., URLLC, an unlicensed band, or millimeter wave). However, the embodiment(s)/implementation(s) of the present disclosure may also be applied to physical channel transmission/reception in mini slots for eMBB or physical channel transmission/reception in slots for URLLC or other communication schemes.

In the case of a service with strict latency and reliability requirements (e.g., a URLLC service), the reliability of PUSCH/PDSCH transmission needs to be higher than that of existing PUSCH/PDSCH transmission. Repeated transmission of the PUSCH/PDSCH may be considered to improve the reliability of PUSCH/PDSCH transmission.

Figure 9:
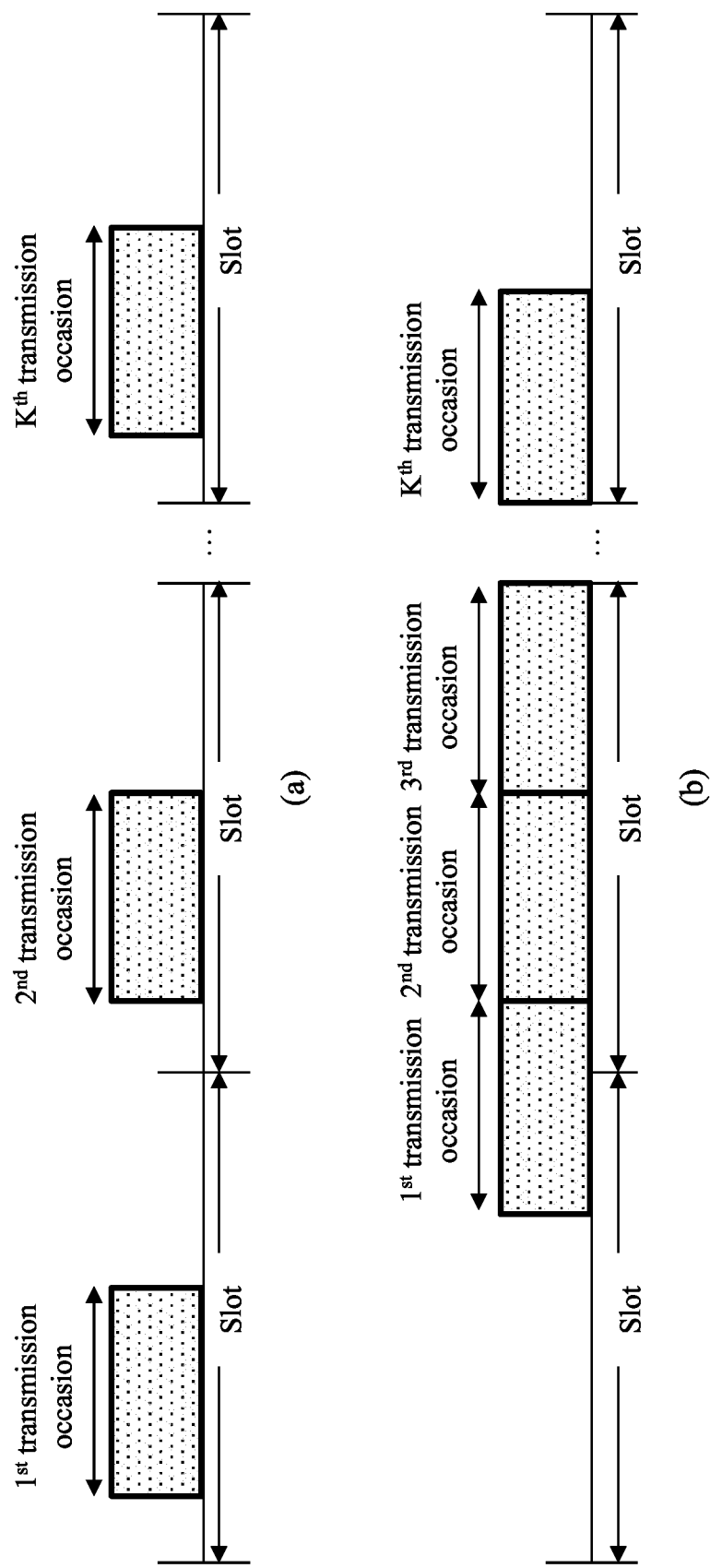
FIG. 9 illustrates an example of types of repeated transmissions.

FIG. 9 illustrates an example of types of repeated transmissions. Two types of repeated transmissions may be scheduled. In some implementations of the present disclosure, repetition of the PUSCH/PDSCH may be applied to PUSCH/PDSCH transmission based on dynamic grants/DL assignments through a PDCCH. Repetition of the PUSCH/PDSCH may also be applied to PUSCH/PDSCH transmission based on a configured grant. Repetitions to be applied to PUSCH/PDSCH transmission may be indicated or configured to a UE by a BS. For example, a repetition factor K may be indicated to the UE through L1 signaling by the BS or may be configured to the UE through higher layer signaling by the BS. When the repetition factor K used to indicate the number of repetitions of repeated transmissions is indicated or configured to the UE, the UE may repeat transmission/reception of a transport block across K transmission/reception opportunities. In the present disclosure, the repetition factor may also be referred to as a repeated transmission factor.

The UE may be configured to perform multi-slot PUSCH transmission or multi-slot PDSCH reception. For example, referring to FIG. 9(a), the UE may be configured by the BS to apply allocation of the same symbol(s) across K consecutive slots where K is an integer greater than 1. In this case, the UE may apply allocation of the same slot(s) in each of the K consecutive slots and may repeat transmission/reception of the transport block (TB) across the K consecutive slots. In the present disclosure, a time in which one TB is to be transmitted/received may be referred to as a transmission occasion/reception occasion. For example, when PDSCH/PUSCH repetition of K times for a serving cell is indicated to the UE, the UE may perform PDSCH reception/PUSCH transmission in K consecutive DL slot(s)/subslot(s) starting from a slot/subslot n. In this, the UE may assume that all K PDSCH receptions/transmissions are performed in the same resource block(s).

When the UE determines symbols of a slot allocated for PUSCH/PDSCH according to a TDD UL-DL configuration through higher layer signaling and/or SFI DCI, transmission/reception on the slot may be omitted from multi-slot PUSCH/PDSCH transmission/reception.

Hereinafter, PUSCH/PDSCH repetition performed by applying the same resource allocation to a plurality of consecutive slots may be referred to as a PUSCH/PDSCH repetition type A. In the case of the PUSCH/PDSCH repetition type A, when the UE receives resource allocation for wireless transmission from the BS, it may be possible to repeatedly use a time-frequency resource defined in one slot in units of slots.

However, when the BS has the UE perform PUSCH/PDSCH transmission/reception across a plurality of consecutive slots using the same resource allocation, the BS needs to reserve the plurality of consecutive slots. There may be a problem in that it makes flexible resource allocation difficult. When the BS intends to perform PDCCH transmission and PUSCH/PDSCH transmission in one slot in order to ensure latency, only some symbols of a second half of the slot may be available as a PUSCH/PDSCH transmission opportunity, and thus repetition of the PUSCH/PDSCH to ensure reliability may cause great latency. In the case of PUSCH/PDSCH transmission based on a configured grant, resource allocation for one TB may always be determined within one period of the configured grant. For example, the time duration for K repeated transmissions for one TB may not exceed a time duration induced by a period P of the configured grant. In some embodiments/implementations of the present disclosure, the UE may transmit/receive the PUSCH/PDSCH according to a redundancy version (RV) sequence only at a predetermined position among a plurality of PUSCH/PDSCH resources for PUSCH/PDSCH repetition. For example, in some embodiments/implementations, when a configured RV sequence is {0, 2, 3, 1}, the UE may start initial transmission of the TB at the first transmission opportunity among K transmission opportunities of K repetitions. In this case, in order to ensure the reliability of PUSCH/PDSCH transmission, a long time needs to be ensured or it may be difficult to configure a short period using a plurality of PUSCH resources. In particular, when TB transmission is started in the middle of a plurality of PUSCH/PDSCH resources within a period of the configured grant, in other words, in an intermediate transmission opportunity among transmission opportunities, it may be difficult to perform repeated transmissions a sufficient number of times. Thus, in the next radio access technology, a technology for more flexible scheduling by configuring resources irrespective of a slot boundary for URLLC or repeatedly using recourses in units of symbols has been discussed. For more flexible and effective resource utilization and service support and faster and more robust UL/DL channel transmission, for example, as shown in FIG. 9(b), it may be necessary to repeat the PUSCH/PDSCH at a shorter interval than a slot or to allocate resources for PUSCH/PDSCH repetition irrespective of the slot boundary.

Referring to FIG. 9(b), the UE may be indicated or configured by the BS to perform PUSCH/PDSCH repetition back-to-back. Hereinafter, PUSCH/PDSCH repetition in which radio resources for PUSCH/PDSCH repetition are concatenated back-to-back in the time domain may be referred to as a PUSCH/PDSCH repetition type B.

According to semi-persistent scheduling (SPS) or a configured grant (CG), resource allocation information may be provided through an RRC configuration rather than the PDCCH. According to DCI (e.g., a timeDomainAllocation value m (i.e., a TDRA value), frequencyDomainAllocation (i.e., an FDRA value), or mcsAndTBS in a type 1 CG configuration) provided through an RRC configuration, an interpretation result may vary depending on which DCI format is assumed for interpretation of the corresponding DCI. For example, even for the same TDRA value, different TDRA may be determined depending on which DCI format is used for a TDRA table to interpret the TDRA value, and even for the same mcsAndTBS value, a different MCS value may be determined depending on which MCS table is used.

In the present disclosure, methods for removing ambiguity that occurs because a plurality of DCI formats available for configured scheduling such as a configured grant or semi-static scheduling (e.g., configured grant or semi-persistent scheduling (SPS)) is configured when a DCI format is used in activation/release or retransmission for the configured scheduling will be described.

In some scenarios, a plurality of DCI formats may be configured for UL or DL scheduling and may be used in activation/release or retransmission for the configured scheduling. The UE may use a related RRC parameter and/or a predetermined value or table in order to interpret each DCI format.

In order to differentiate between different services with different DCI formats and to schedule the services or to selectively use characteristic functions related to different DCI formats, the BS may configure a separate RRC parameter for each DCI format, and the UE and the BS may apply different RRC parameters when the respective DCI formats are interpreted. In order to support traffic having different characteristics through configured scheduling and dynamic scheduling when the configured scheduling is configured, the BS may configure a separate RRC parameter for the configured scheduling in addition to an RRC parameter for the dynamic scheduling to the UE.

In some scenarios, when receiving DCI through the PDCCH for activation/release of the configured scheduling, the UE and the BS may use an RRC parameter included in a configuration of the configured scheduling instead of the RRC parameter for the dynamic scheduling in order to interpret the corresponding DCI. However, when a plurality of DCI formats is configured, if the same method is used, it may be difficult to configure an appropriate RRC parameter for each DCI format or a large number of RRC parameters may be configured unnecessarily for configuration of each configured scheduling.

When only RRC signaling is used without use of DCI carried by the PDCCH for activation/release, for example, when a type 1 CG configuration is used, the BS and the UE may also transmit and receive information included in one DCI format through RRC signaling, and thus DCI included in the RRC signaling needs to be interpreted in the end. For example, in the case of the type 1 CG, the BS may transfer information, to be transferred by one DCI format, to the UE through a higher layer parameter rrc-ConfiguredUplinkGrant that provides a configuration for "configured grant" transmission with a fully RRC-configured UL grant. In this case, when a plurality of DCI formats and a plurality of RRC parameters therefor are configured, the UE and the BS may use a predetermined DCI format and, in this case, needs to determine which RRC parameter is to be used.

In the present disclosure, a method of determining a DCI format to be used to interpret the configured scheduling and methods of selecting an RRC parameter for interpreting the configured scheduling when the BS and the UE transmit and receive DCI through L1 signaling (e.g., a PDCCH) and/or higher layer signaling for the configured scheduling will be described.

Hereinafter, implementations for determining and interpreting a DCI format used in configured scheduling such as semi-persistent scheduling (SPS) or configured grant (CG) when the UE receives a configuration of a plurality of DCI formats and a plurality of RRC parameters from the BS will be described. In more detail, a method of determining a bit length of each field included in a DCI format received through L1 signaling (e.g., a PDCCH) and selecting an RRC parameter for interpreting the bit length and implementations for selecting a DCI format to be used to interpret DCI (e.g., a timeDomainAllocation value m (i.e., a TDRA value), frequencyDomainAllocation (i.e., a FDRA value), or mcsAndTBS in a type 1 CG configuration) received through higher layer signaling, a bit length of each field configuring the corresponding format, and an RRC parameter for interpreting the bit length will be described. Some implementations of the present disclosure may be performed in different ways depending on a used DCI format.

In some implementations of the present disclosure, the UE may receive a DCI format, a length of each field (or a bit width), and a plurality of RRC parameters for interpreting the respective fields through RRC signaling and may then select RRC parameter(s) to be applied to DCI receive through RRC signaling or the PDCCH among the plurality of RRC parameters.

Implementation(s) of the present disclosure to be described below will be described by taking a PUSCH as an example for convenience, but may also be applied to other channels and signal of UL and DL. When the following description/proposed procedure and/or methods are applied to DL transmission, a UL configured grant may correspond to semi-static scheduling (SPS) and RRC-configured ConfiguredGrantConfig IE may correspond to RRC-configured sps-Config IE. When implementation(s) of the present disclosure is applied to DL transmission, DCI format 0_x used in UL allocation in the following procedure and/or methods may refer to DCI 1_x used in DL allocation.

In Terms of UE

First, implementations of the present disclosure will be described in terms of a UE.

Figure 10:
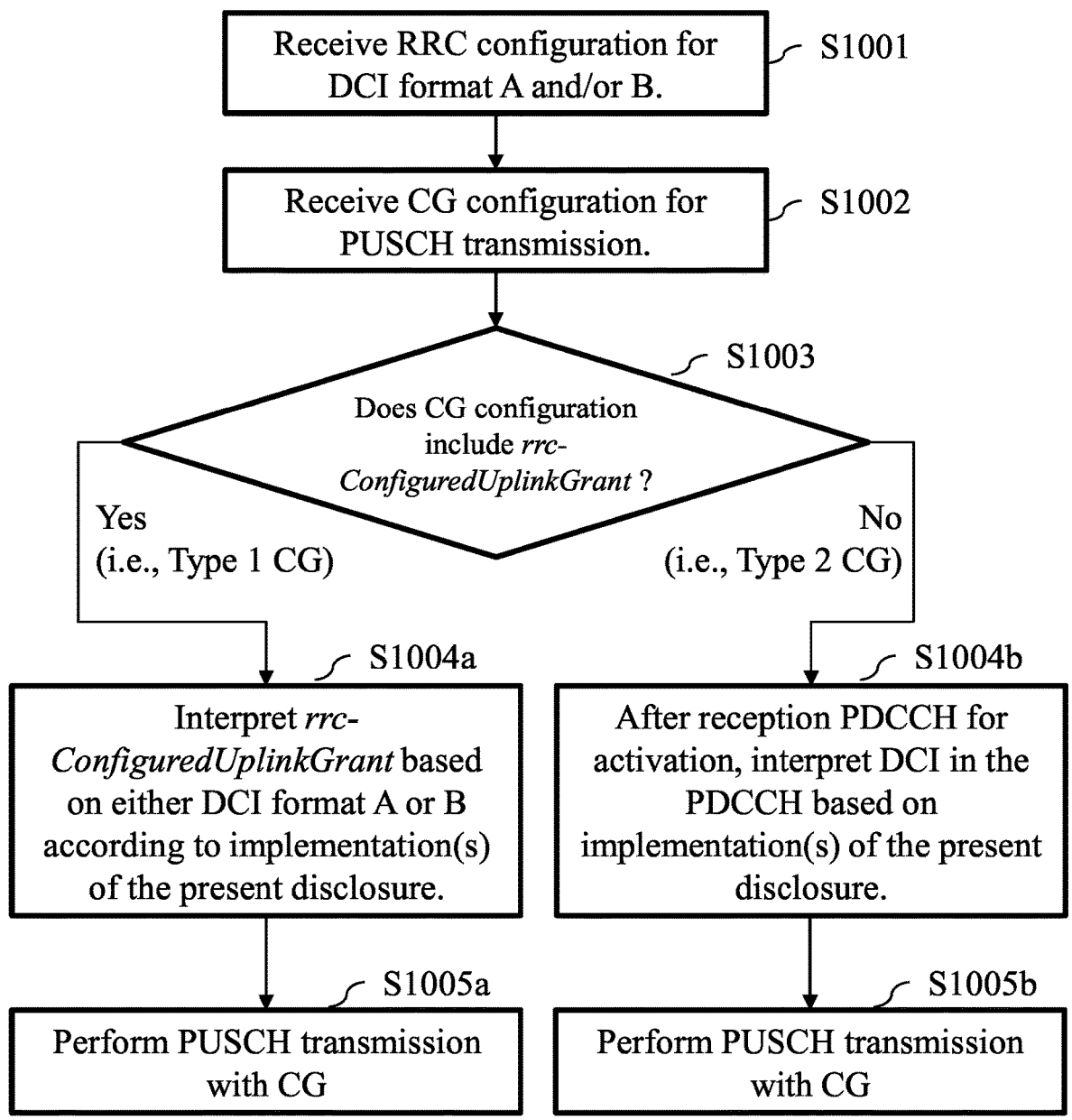
FIG. 10 is a diagram showing an example of an UE operation according to some implementation(s) of the present disclosure.

FIG. 10 is a diagram showing an example of an UE operation according to some implementation(s) of the present disclosure. According to some implementations of the present disclosure, the UE may determine a DCI format and an RRC parameter to be used in transmission of a configured grant (e.g., CG-based PUSCH transmission). Hereinafter, an example of a UE operation according to some implementations of the present disclosure will be described. The UE operation according to some implementations of the present disclosure is not limited to the following example.

(1) The UE may receive RRC parameter(s) for each of a plurality of DCI formats from the BS (S1001). For example, the UE may receive higher layer parameters indicating a frequency resource allocation type to be applied to a DCI format, a resource block group (RGB) size for a physical shared channel scheduled by the DCI format, whether to apply transform precoding for the physical shared channel scheduled by the DCI format, a TDRA table for the DCI format, a frequency hopping method of the physical shared channel scheduled by the DCI format, a repetition scheme for the physical shared channel scheduled by the DCI format, a number of repetitions of the physical shared channel scheduled by the DCI format, a DM-RS configuration for the physical shared channel scheduled by the DCI format, a modulation and coding scheme (MCS) table for the physical shared channel scheduled by the DCI format, a bit length of a redundancy version (RV) field in the DCI format, a bit length of a HARQ process number field in the DCI format, and/or beta-offset for the physical shared channel scheduled by the DCI format, through RRC signaling.

The operation of receiving parameter(s) to be applied to each DCI format through RRC signaling from the BS by the UE may be implemented by, for example, the device of FIG. 2 or 3. Referring to FIG. 2, the one or more processors 102 may control one or more transceivers 106 and/or one or more memories 104 to receive a parameter to be applied to each DCI format through RRC signaling, and the one or more transceivers 106 may receive parameter(s) to be applied to each of the DCI formats through the RRC signaling from the BS.

In some implementations of the present disclosure, the higher layer parameters may be received in an RRC Connection Setup procedure of an initial access procedure.

(2) The UE may receive a configured grant (CG) configuration (e.g., configuredGrantConfig as an RRC configuration) from the BS through RRC signaling (S1002). In implementations of the present disclosure, the UE may receive the RRC configuration for each DCI format and the CG configuration separately or together or may receive the CG configuration before the RRC configuration for each DCI format.

The operation of receiving the CG configuration from the BS through RRC signaling by the UE may be implemented by, for example, the device of FIG. 2 or 3. For example, referring to FIG. 2, the one or more processor 102 may control the one or more transceivers 106 and/or the one or more memories 104 to receive RRC signal including the CG configuration and the one or more transceivers 106 may receive the RRC signaling from the BS.

(3) According to whether a parameter rrc-ConfiguredUplinkGrant is present in the CG configuration (S1003), the UE may determine whether a type of PUSCH transmission using a CG based on the CG configuration is a CG type 1 or a CG type 2.

rrc-ConfiguredUplinkGrant may include, for example, the following parameters:

timeDomainOffset indicating an offset of a resource with respect to system frame number (SFN)=0 in the time domain;

timeDomainAllocation value m that provides a row index m+1 pointing to the TDRA table, indicating a combination of the start symbol S, the length L, and the PUSCH mapping type;

frequencyDomainAllocation that provides frequency domain resource allocation; and/or mcsAndTBS that provides $I_{MCS}$ indicating a modulation order, a target code rate, and a transport block size; and/or pusch-RepTypeIndicator indicating the repetition scheme of the PUSCH.

The UE may interpret parameter(s) or DCI (in the CG configuration) transmitted through RRC depending on the CG type of the CG of the CG configuration.

A. For example, when the rrc-ConfiguredUplinkGrant parameter is included in the CG configuration (Yes in S1003), in other words, when the CG of the CG configuration is a CG type 1 (i.e., a type 1 CG), the UE may interpret the rrc-ConfiguredUplinkGrant according to one implementation of the present disclosure (S1004a).

B. For example, when the rrc-ConfiguredUplinkGrant parameter is not included in the CG configuration, in other words, when the CG of the CG configuration is a CG type 2 (i.e., a type 2 CG), the UE may interpret DCI included in a PDCCH according to an implementation of the present disclosure after receiving the PDCCH for activating the CG (S1004b).

The operation of determining a type of the CG according to whether the rrc-ConfiguredUplinkGrant parameter is included in the CG configuration and interpreting DCI according to each type by the UE may be implemented by the device of FIG. 2 or 3. For example, referring to FIG. 2, the one or more processors 102 may determine the type of the CG according to whether the rrc-ConfiguredUplinkGrant parameter is present in the CG configuration and may interpret DCI included in the rrc-ConfiguredUplinkGrant or the PDCCH according to each type.

(4) The UE may perform PUSCH transmission using the activated CG through a series of processes (S1005a and S1005b). For example, the UE may interpret DCI according to a type of the CG recognized by the UE based on whether the rrc-ConfiguredUplinkGrant is included in the CG configuration, and may transmit, to the BS based on the interpreted DCI, the PUSCH on a UL resource that is based on the activated CG.

The operation of transmitting the PUSCH on a resource based on the activated CG by the UE may be implemented by the device of FIG. 2 or 3. For example, referring to FIG. 2, the one or more processors 102 may control the one or more transceivers 106 and/or the one or more memories 104 to transmit the PUSCH on a resource based on the activated configured grant, and the one or more transceivers 106 may transmit the PUSCH on the resource based on the activated CG.

In relation to the UE operation, the following may be additionally considered.

<Implementation A1>

When the UE is semi-statically allocated a type 2 CG PUSCH transmission through valid activation DCI, the UE may not expect other DCI formats except for a specific DCI format among a plurality of DCI formats configured for activation, release and/or retransmission to be used for activation and/or release. Alternatively, the UE may expect only a specific DCI format to be used for activation and/or release.

The specific DCI format may be configured commonly to a plurality of configured grants through higher layer signaling of the BS or separately for each configured grant. For example, the BS may configure a parameter for selecting one value among {formats0-0-And-0-1, formats0-0-And-0-2, and formats0-0-And-0-1-And-0-2} to the UE and may limit a DCI format to be used in the configured grant. For example, when the BS informs the UE to use formats0-0-And-0-1 among {formats0-0-And-0-1, formats0-0-And-0-2, and formats0-0-And-0-1-And-0-2}, only a DCI format 0_0 and a DCI format 0_1 may be limited to be used to activate/release a type 2 CG. That is, the BS may transmit a parameter indicating a DCI format to be applied to transmission of a configured grant among a plurality of DCI formats to the UE, and the UE may select a specific DCI format to be applied to transmission of the configured grant based on the parameter transmitted from the BS. In this case, when a plurality of configured grants are present, the same DCI format may be applied to transmissions of the plurality of configured grants or different DCI formats may be applied thereto.

With regard to transmission of the configured grant, based on the parameter transmitted from the BS, an applied DCI format may be limited to be included in a set of specific DCI formats. For example, the BS may transmit the set of the DCI formats to be applied separately for each of the configured grants or commonly to the configured grants to the UE, and the UE may select one of the DCI formats included in the received set and may apply the selected DCI format to transmission of the configured grant.

Alternatively, the BS may transmit a parameter value indicating each of the DCI formats to be applied to transmission of the configured grant to the UE, and the UE may select a specific DCI format to be applied to transmission of the configured grant by selecting a specific parameter value among the received parameter values. In this case, the DCI formats may be DCI formats included in the DCI format set including the DCI formats to be applied to the configured grant.

For example, the BS may transmit a DCI format set {formats0-0-And-0-1, formats0-0-And-0-2, and formats0-0-And-0-1-And-0-2} or may transmit parameter values indicating the respective DCI formats included in the DCI format set to the UE. When receiving the DCI format set, the UE may select a specific DCI format in the DCI format set and may apply the selected DCI format to the configured grant. When receiving the parameter values indicating the respective DCI formats included in the DCI format set, the UE may select one of the parameter values and may apply a specific DCI format indicated by the selected parameter value to the configured grant.

Alternatively, the specific DCI format may be a DCI format that satisfies the following conditions.

- A DCI format having a corresponding priority during dynamic scheduling when the priority of corresponding transmission is included in the CG configuration and is determined according to the DCI format during dynamic scheduling. For example, when the priority is configured for transmission that is based on the configured grant, the DCI format for dynamic scheduling having the same priority as the configured priority may also be applied to the configured grant.
- A DCI format having a bit length that is equal to or smaller than a bit length of each DCI field of the case in which the corresponding DCI format is used in dynamic scheduling (e.g., a DCI format with CRC scrambled by C-RNTI) even if an RRC parameter (e.g., ConfiguredGrantConfig IE) included in the CG configuration is applied to a certain DCI format. For example, when a parameter included in RRC configuration information of the configured grant is applied to the DCI format, a DCI format having a bit length or bit width equal to or smaller than a bit length or a bit width of each field of the same DCI format as that used in dynamic scheduling may be used in transmission of the configured grant.
- A DCI format used in the same repetition scheme as a repetition scheme for the CG configuration when a repetition scheme is configured for the CG configuration and a repetition scheme is determined according to the DCI format during dynamic scheduling. For example, when the repetition scheme is configured for transmission that is based on the configured grant, a DCI format (used in dynamic scheduling of transmission) using the same repetition scheme as the configured repetition scheme may also be applied to the configured grant.

<Implementation A1-1>

When the UE is semi-statically allocated a type 2 CG PUSCH transmission through valid activation DCI, the UE may expect DCI having certain characteristics to be used for activation and release.

In more detail, the UE may consider a CORESET and/or a search space of a PDCCH, on which corresponding DCI is received, for validating a PDCCH reception for activation or release. For example, when a priority of transmission through the corresponding configured grant is configured in a certain CG configuration and a priority of dynamic scheduling is determined according to the CORESET and/or the search space on which the DCI of the dynamic scheduling is received, the UE may expect DCI for a certain CG configuration to be received only in a CORESET and/or a search space having the same priority of dynamic scheduling as the priority configured in the CG configuration. For example, receiving DCI in the CORESET and/or search space having the same priority as the priority in the CG configuration may be a necessary condition for determining valid activation or release DCI. In other words, receiving DCI in the CORESET and/or search space having the same priority as the priority in the CG configuration may be used as one of conditions for determining the validity of the activation DCI or the release DCI.

<Implementation A2>

When receiving activation DCI of a type 2 CG PUSCH in a specific DCI format, the UE may use RRC parameter(s) included in the CG configuration in DCI interpretation. The specific DCI format may be a DCI format having each field with higher configurability than an existing DCI format, for example, a DCI format 0_2. In some implementations, implementation A2-1 and/or implementation A2-2 may be considered.

<Implementation A2-1>

When parameter(s) related to the specific DCI format is parameter(s) that limits the size of a certain field of the specific DCI format or is not present in a CG configuration, the corresponding parameter may be applied to DCI interpretation for the CG configuration. In this case, when a DCI field is difficult to interpret using an existing method while having additional flexibility due to the corresponding parameter, the DCI field may be interpreted using the same method as a method of interpreting a corresponding field when a corresponding DCI format is used in dynamic scheduling (e.g., a DCI format 0_2 having a CRC scrambled by a C-RNTI).

For example, when a new resource allocation (RA) type is used in a corresponding DCI format, the UE may use an RA type used in the corresponding DCI format, not the RA type of the CG configuration. That is, when the RA type based on the CG configuration and the RA type based on the DCI format are different from each other, the UE may use the RA type based on the DCI format. In this case, a resource assignment field of the time or frequency domain may be interpreted using the same method as a method when the corresponding DCI format is used in dynamic scheduling.

In another example, when a certain parameter provided to the UE by the BS through RRC signaling configures a specific field of a corresponding DCI format with 0 bit, that is, omits the specific field, the UE may assume that the corresponding DCI field is omitted even if the corresponding DCI format is used in the CG configuration. In this case, when the omitted DCI field value is assumed to be '0' or '1' and is not interpreted and the corresponding DCI format is used in dynamic scheduling (e.g., a DCI format 0_2 with CRC scrambled by a C-RNTI), the same value or operation as a value or operation assumed when the corresponding DCI field is omitted may be used for the corresponding field.

<Implementation A2-2>

When the RRC parameter to replace the RRC parameter related to a certain DCI field of the specific DCI format does not exist in the CG configuration, an RRC parameter or a determination method used when the specific DCI format is used in dynamic scheduling (e.g., a DCI format 0_2 with CRC scrambled by a C-RNTI) may be used.

For example, when a mcs-table parameter for selecting an MCS table to be used is not included in the CG configuration, the UE may use a predefined/configured MCS table or a mcs-table parameter configured to determine the same may be used for a DCI format 0_2 with CRC scrambled by a C-RNTI, with respect to the DCI format 0_2 with CRC scrambled by the C-RNTI.

That is, in the implementation A2-1 and/or the implementation A2-2, when receiving parameter(s) that is different from or is not included in the CG configuration through RRC signaling, the UE may perform PUSCH transmission using the parameter(s) received through RRC signaling. In some implementations, the DCI field may be partially omitted through RRC signaling.

<Implementation A3>

When receiving activation DCI of a type 2 CG PUSCH in a specific DCI format, the UE may use an RRC parameter or interpretation method used when the specific DCI format is used in dynamic scheduling (e.g., a DCI format 0_2 with CRC scrambled by a C-RNTI) rather than using the RRC parameter included in the CG configuration in DCI interpretation. The specific DCI format may be a DCI format (e.g., a DCI format 0_2) having each field with higher configurability than an existing DCI format. More specifically, the following may be considered.

<Implementation A3-1>

When the implementation A3 is used, the UE may exceptionally use the RRC parameter included in the CG configuration with respect to the specific RRC parameter related to a certain field. For example, the specific RRC parameter may be at least one of the followings:

repK or pusch-AggregationFactor indicating the number of repetitions;

repK-RV indicating a redundancy version sequence to be used;

rbg-Size indicating selection between configurations 1 and 2 (refer to Table 6.1.2.2.1-1 of 3GPP TS 38.214) for the size of an RBG for a PUSCH;

mcs-Table indicating an MCS table to be used for a PUSCH without transform precoding by a UE;

mcs-TableTransformPrecoder indicating an MCS table to be used for a PUSCH with transform precoding by a UE;

DMRS-Configuration or cg-DMRS-Configuration to be used to configure a UL DMRS for a PUSCH;

frequencyHopping enabling intra-slot frequency hopping or inter-slot frequency hopping; and/or p0-PUSCH-Alpha that is an index of p0-PUSCH-AlphaSet including an alpha value for power control of a PUSCH and a value PO for power control of the PUSCH.

According to the implementation A3-1, an RRC parameter for dynamic scheduling may be freely configured while multiplexing different configured grants with each other or using a configured grant in which different UEs share a resource by using the same RRC parameter as dynamic scheduling for ease of DCI interpretation and also maintaining some flexibility and configurability of the configured grant.

<Implementation A4>

When the UE is semi-statically allocated a type 1 CG PUSCH transmission by receiving a CG configuration including specific RRC parameter(s) (e.g., rrc-ConfiguredUplinkGrant) for resource allocation, the UE may assume a specific DCI format in order to interpret the specific RRC parameter(s). The specific DCI format may be configured commonly to a plurality of configured grants or separately for each configured grant, through higher layer signaling of the BS.

For example, the BS may configure a parameter for selecting one value among {formats0-0, formats0-1, and formats0-2} to the UE and may assume the corresponding configured DCI format for interpretation of rrc-ConfiguredUplinkGrant of the configured grant. When this parameter is not present, the UE may assume a specific DCI format (e.g., a DCI format 0_1) for this as a default. That is, when the UE does not receive the parameter for selecting the specific DCI format from the BS, the UE may assume a specific DCI format (e.g., a DCI format 0_1) in order to interpret rrc-ConfiguredUplinkGrant of the configured grant.

Alternatively, without a separate configuration, a specific DCI format (e.g., a DCI format 0_1) may be assumed for interpretation of rrc-ConfiguredUplinkGrant of the configured grant.

Alternatively, the specific DCI format may be a DCI format that satisfies the following condition. In some implementations of the present disclosure, when a plurality of DCI formats satisfy the corresponding condition, the specific DCI format may be assumed to be a DCI format having a larger size or a DCI format 0_1.

A DCI format having a corresponding priority during dynamic scheduling, when a priority of corresponding transmission is configured for the CG configuration and a priority is determined according to a DCI format during dynamic scheduling. That is, when a priority is configured for transmission that is based on the configured grant, the DCI format for dynamic scheduling having the same priority as the configured priority may also be applied to the configured grant. For example, when a DCI format having the specific priority used during dynamic scheduling is a DCI format 0_1, DCI of the DCI format 0_1 may also be applied to a CG configuration having the same priority as the specific priority.

A DCI format having a bit length that is equal to or smaller than a bit length of each DCI field of the case in which the DCI format having a bit length or width of each DCI field based on an RRC parameter of the CG configuration is used in dynamic scheduling (e.g., a DCI format with CRC scrambled by a C-RNTI), when the RRC parameter (e.g., ConfiguredGrantConfig IE) included in the CG configuration is applied to a certain DCI format. That is, in the case in which a parameter included in RRC configuration information of the configured grant is applied to a DCI format, when the DCI format has a bit length or bit width equal to or smaller than a bit length or bit length of each field of the same DCI format as that used in dynamic scheduling, the DCI format may be used in transmission of the configured grant. For example, in the case in which a parameter included in RRC configuration information of the configured grant is applied to a DCI format 0_1, when a bit length or bit width of each field of the DCI format 0_1 used in dynamic scheduling is equal to or longer than the DCI format 0_1 of the configured grant, the DCI format 0_1 may be used in transmission of the configured grant.

A DCI format using the same repetition scheme during dynamic scheduling, when a repetition scheme is configured in a CG configuration and a repetition scheme is determined according to a DCI format during dynamic scheduling. That is, when the repetition scheme is configured to transmission that is based on the configured grant, a DCI format for dynamic scheduling using the same repetition scheme as the configured repetition scheme may also be applied to the configured grant. For example, when a repetition scheme in a CG configuration is set to be a repetition type B, a repetition scheme in an RRC configuration in the DCI format 0_1 is set to be a repetition type A, and a repetition scheme in an RRC configuration in the DCI format 0_2 is set to be a repetition type B, the UE may interpret an RRC parameter included in the CG configuration based on the RRC configuration for the DCI format 0_2.

The specific RRC parameter may be a set of a plurality of parameters that refer to respective fields of a certain DCI format. In this case, when the specific RRC parameter is a set of certain RRC parameters, different sets may be used according to the selected specific DCI format.

When parameter(s) of rrc-ConfiguredUplinkGrant in a type 1 CG configuration is interpreted based on an RRC configuration for a specific DCI format, the RRC configuration (e.g., a TDRA table or an MCS table) used to interpret the parameter(s) of rrc-ConfiguredUplinkGrant may not need to be separately provided to the UE, and thus signaling overhead may be reduced. For example, even if the BS does not separately signal the TDRA table and the MCS for the type 1 CG configuration to the UE, the UE may be capable of interpreting a TDRA value and MCS value in the type 1 CG based on the TDRA table and the MCS table configured for the specific DCI format, and thus signaling overhead may be reduced.

When the UE interprets the parameter(s) of rrc-ConfiguredUplinkGrant in the type 1 CG configuration based on the RRC configuration for the DCI format that satisfies a specific condition, the BS may not need to explicitly signal the DCI format to the UE, and thus signaling overhead may be reduced. For example, the BS may set a repetition type B for transmission that is based on the DCI format 0_1, may set a repetition type A for the DCI format 0_2, may set a repetition scheme B for transmission based on the type 1 CG configuration, and may perform transmission to the UE, and accordingly, may inform the UE that the parameter(s) of rrc-ConfiguredUplinkGrant needs to be interpreted based on the RRC configuration for the DCI format 0_1. Thus, the BS may not need to explicitly signal a DCI format related to the type 1 CG configuration to the UE, and thus signaling overhead may be reduced.

When the DCI format assumed to interpret rrc-ConfiguredUplinkGrant included in the CG configuration is determined to be fixed, if the repetition scheme for transmission based on the DCI format is different from the repetition scheme based on the CG configuration, there may be a limit in performing scheduling by the BS. For example, in the state in which a DCI format related to the type 1 CG configuration is defined to be fixed to the DCI format 0_1, when the BS intends to set the repetition scheme in the type 1 CG configuration to the repetition type B and to set the repetition scheme in the RRC configuration for the DCI format 0_1 to the repetition type A, as resource allocation (e.g., time domain resource allocation) for the repetition type A and resource allocation for the repetition type B have different limits, the BS may need to perform resource allocation for the type 1 CG only in resource allocation (e.g., TDRA entries) to be applied to both the repetition type A and the repetition type B. Alternatively, there may be a limit in that the BS needs to configure the repetition scheme of the type 1 CG to be always the same as the repetition scheme for the DCI format fixed to be used to interpret the type 1 CG. In contrast, when the UE interprets parameter(s) of rrc-ConfiguredUplinkGrant in the type 1 CG configuration based on the RRC configuration for the DCI format that satisfies the specific condition, scheduling flexibility may be ensured compared with the case in which the DCI format related to the type 1 CG configuration is fixed to the specific DCI format.

Accordingly, according to the present implementation, implementation of the UE and the BS may be simplified while reducing unnecessary signaling overhead between the UE and the BS.

Figure 11:
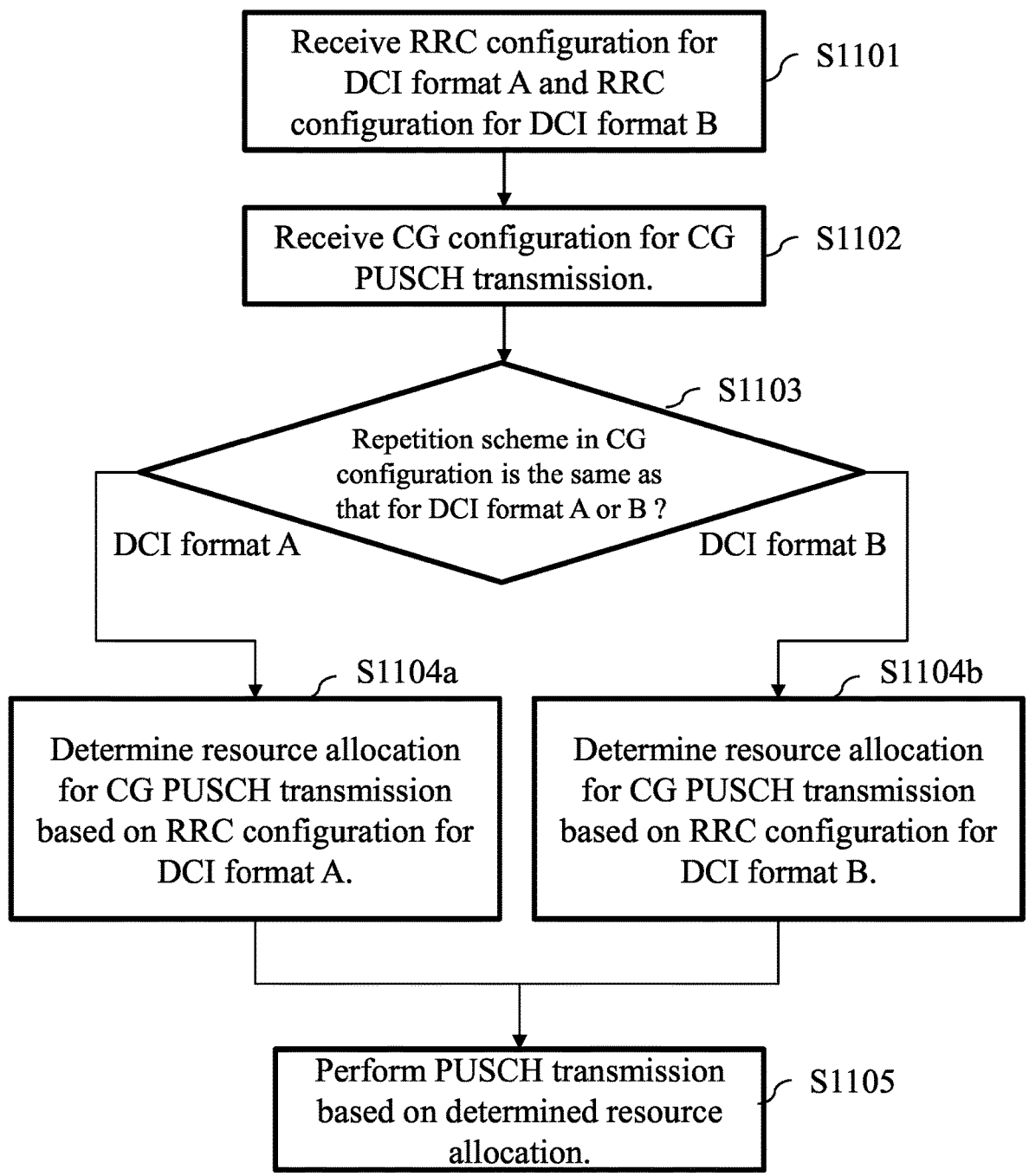
FIG. 11 is a diagram showing an example of a UE operation according to some implementations of the present disclosure.

FIG. 11 is a diagram showing an example of a UE operation according to some implementations of the present disclosure. Referring to FIG. 11, the UE may receive an RRC configuration for a DCI format A and an RRC configuration for a DCI format B (S1101) and may receive a CG configuration for CG-based PUSCH transmission (through RRC signaling) (S1102). Each of the RRC configuration for the DCI format A and the RRC configuration for the DCI format B may include a parameter indicating a repetition scheme for PUSCH transmission that is dynamically scheduled by the corresponding DCI format. The CG configuration may include a parameter indicating a repetition scheme for the CG-based PUSCH transmission. When the CG-based PUSCH transmission is type 1 CG PUSCH transmission, DCI for the PUSCH transmission may not be determined based on a DCI format of an activation PDCCH, and a specific DCI format needs to be assumed in order to interpret some or all (e.g., resource allocation information) of the parameters of rrc-ConfiguredUplinkGrant in the CG configuration. In some implementations of the present disclosure, some or all (e.g., resource allocation information) of the parameters of rrc-ConfiguredUplinkGrant in the CG configuration may be interpreted based on a DCI format having an RRC configuration in which the same repetition scheme as the repetition scheme set for the CG configuration is set. For example, in some implementations of the present disclosure, when resource allocation information for the CG-based PUSCH transmission is included in the CG configuration and the repetition scheme for the CG-based PUSCH is set to the repetition type B in the CG configuration (DCI format A in S1103), the UE may interpret the resource allocation information based on the RRC configuration for the DCI format having an RRC configuration in which a repetition scheme is set to the repetition type B. For example, when the repetition scheme for the DCI format A (e.g., a DCI format 0_1) is set to the repetition type B, the UE may interpret the resource allocation information based on the RRC configuration for the DCI format A to determine a resource for the CG-based PUSCH transmission (S1104a). For example, when the repetition scheme in the CG configuration is the same as the repetition scheme in the RRC configuration for the DCI format A, the UE may apply a TDRA value in the CG configuration to the TDRA table for the DCI format A to determine a resource for CG PUSCH transmission. When the repetition scheme configured through the RRC configuration for the DCI format A is not the repetition type B (e.g., when the repetition scheme for the RRC configuration for the DCI format B is set to the repetition type B) (DCI format B in S1103), the UE may interpret the resource allocation information based on the RRC configuration for the DCI format B (e.g., a DCI format 0_2) to determine a resource for the CG-based PUSCH transmission (S1104b). For example, when the repetition scheme in the CG configuration is different from the repetition scheme in the RRC configuration for the DCI format A (or when the repetition scheme in the CG configuration is the same as the repetition scheme in the RRC configuration for the DCI format B), the UE may apply a TDRA value in the CG configuration to a TDRA table for the DCI format B to determine a resource for CG PUSCH transmission. The UE may perform PUSCH transmission based on the determined resource.

In the implementation A4, implementations A4-1 and/or A4-2 may also be additionally considered.

<Implementation A4-1>

When the UE uses a specific DCI format in order to interpret a specific parameter (e.g., rrc-ConfiguredUplinkGrant) for resource allocation of a certain CG configuration, the UE may use an RRC parameter or interpretation method used when the specific DCI format is used in dynamic scheduling (e.g., a DCI format with CRC scrambled by a C-RNTI) rather than using an RRC parameter included in the CG configuration to interpret a parameter based on the specific DCI format.

For example, when one of the DCI format A and the DCI format B is used to interpret the specific parameter, the UE may interpret the specific parameter based on an RRC parameter referenced when the DCI format A is used in dynamic scheduling in the case in which the specific RRC parameter needs to be interpreted based on the DCI format A and the UE may interpret the specific parameter with reference to an RRC parameter included in the corresponding CG configuration when the specific parameter needs to be interpreted based on the DCI format B. For example, in a situation in which one of the DCI format 0_0 and the DCI format 0_1 is to be used to interpret the specific parameter, when the BS informs the UE that the DCI format 0_1 is a DCI format related to the CG configuration, the UE may interpret the specific parameter based on a parameter in an RRC configuration for the DCI format 0_1, and when the BS informs the UE that some parameters (e.g., a resource allocation type in the frequency domain) are not configured by RRC and the DCI format 0_0 using a predefined value (e.g., a resource allocation type 0) is a DCI format related to a CG configuration, the UE may interpret the specific parameter with reference to the RRC parameter (e.g., a resource allocation type included in a CG configuration) included in the CG configuration.

That is, when the DCI format 0_1 is used to interpret a specific parameter for a configured grant based transmission, an RRC parameter applied when the DCI format 0_1 is used for dynamic scheduling (i.e., when the DCI format 0_1 is transmitted through a PDCCH) may be applied to interpret the specific parameter.

The specific DCI format may be a DCI format (e.g., a DCI format 0_2) having each field with higher configurability than an existing DCI format.

<Implementation A4-2>

When the UE uses a specific DCI format in order to interpret a specific RRC parameter (e.g., rrc-ConfiguredUplinkGrant) for resource allocation of a certain CG configuration, an RRC parameter related to the specific DCI format may not be included in the specific RRC parameter. In other words, the certain parameter may be an optional parameter. In this case, the UE may perform the same operation as the case in which a DCI field related to the omitted parameter is omitted. For example, when the UE uses a default of a certain field of the DCI format 0_2 when the corresponding field of the DCI format 0_2 is omitted by the RRC parameter, the UE may also perform the same operation when an RRC parameter indicating the corresponding field is omitted.

That is, when a specific field of a specific DCI format is omitted by an RRC parameter, the specific field may be recognized by the UE as being a default. Similarly, even if the RRC parameter for omitting the specific field is not transmitted or is not included in the CG configuration, the UE may interpret the specific field in the same way as in the case in which the specific field is omitted by the RRC parameter.

<Implementation A5>

When a UE receives DCI in a PDCCH for resource allocation and release of a configured grant configuration, a joint activation/release operation of one of a plurality of configured grants may be considered. For example, a configured grant that has the same configured grant index as a value indicated by an HARQ process number field included in DCI may be activated/released.

In order to interpret DCI related to one configured grant configuration, a UE having a plurality of configured grant configurations may use the following RRC parameter or RRC parameter set. When a value of each field included in the DCI is generated, interpreted, and assumed, different options may be used.

Option 1: The UE uses a configured grant configuration (i.e., ConfiguredGrantConfig) having the same configured grant index as a value indicated by the HARQ process number field.

Option 2: When the UE receives a plurality of configured grant configurations, at least DCI for release may use a RRC parameter set (e.g., pusch-config) used in dynamic scheduling.

Option 3: For a specific field (e.g., FDRA, HPN, RV field, etc.), a separate RRC parameter may be configured or a specific parameter value may be predetermined. For example, a separate resourceAllocation parameter for validating a value of an FDRA field for release may be configured or a specific RA type, for example, an RA type 0 or RA type 1 may be assumed.

<Implementation A6>

When a UE receives DCI in a PDCCH for resource allocation and release of a configured grant configuration, a joint activation/release operation for simultaneously activating/releasing a plurality of configured grants may be considered. For example, the UE may release, through one received DCI, resource allocation of one or more configured grant configurations that is previously activated. In this case, a plurality of configured grant configurations may be related to one DCI. For example, a RRC parameter (e.g., entry of Type2Configuredgrantconfig-ReleaseStateList) related to a value indicated by a HARQ process number field included in the DCI may include one or more configured grant indexes.

When a plurality of configured grant configurations is related to one DCI and is activated/released through the DCI, the UE may use the following RRC parameter or RRC parameter set in order to interpret DCI. When a value of each field included in the DCI is generated, interpreted, and assumed, different options may be used.

Option 1: The UE uses a configured grant configuration (i.e., ConfiguredGrantConfig) having the lowest index among configured grant indexes included in a RRC parameter (e.g., entry of Type2Configuredgrantconfig-ReleaseStateList) that has the same state index as a value indicated by an HARQ process number field.

Option 2: When the UE receives a plurality of configured grant configurations or receives a configuration for simultaneously releasing a plurality of configured grant configurations (e.g., if Type2Configuredgrantconfig-ReleaseStateList is configured), at least DCI for release may use an RRC parameter set (e.g., pusch-config) used in dynamic scheduling.

Option 3: For a specific field (e.g., FDRA, HPN, RV field, etc.), a separate RRC parameter may configured or a specific parameter value may be predetermined. For example, a separate resourceAllocation parameter for validating a value of an FDRA field for release may be configured or a specific RA type, for example, an RA type 0 or RA type 1 may be assumed.

To interpret the DCI, the UE may also determine the length of a DCI field using the same RRC parameter/parameter set. For example, when the same ConfiguredGrantConfig as an HARQ ID included in DCI is assumed for DCI interpretation, the length of the FDRA field may be determined through the resourceAllocation, rbg-Size included in ConfiguredGrantConfig and the length of an RB of a UL bandwidth part. In this case, when a DCI format 0_2 is used, an additional parameter (e.g., resourceAllocation-ForDCIFormat0_2, resourceAllocationType1GranularityForDCI-Format0-2-r16) included in the pusch-config may be exceptionally used. According to this, the RRC parameter used is included in only in 0_2, and thus the UE may assume a more accurate DCI length, and the BS may not introduce an unnecessary parameter in order to adjust a DCI size.

<Implementation A7>

Based on the NR Rel.15 standard, the UE may not expect that the size of a corresponding field of DCI for a configured grant configuration is larger than the size of a corresponding field of dynamic scheduling, and may expect that a field is padded to '0' to have the same value of the corresponding field of dynamic scheduling when the size of each field of DCI for the configured grant configuration and DCI for dynamic scheduling is small.

The length of a DCI field determined for activation/release DCI of SPS/CG may also be different from the length of a corresponding DCI field that is based on dynamic scheduling. In this case, the UE may determine a method of making the field lengths to be the same using the following method.

In the implementation A7, when the UE performs bit padding in activation/release DCI of a configured grant for size alignment between a specific field in activation/release DCI of SPS/CG and a corresponding field in dynamic scheduling DCI, for the case where PDCCH validation for activation/release is achieved when the corresponding field is filled with '0', the UE performs padding of '0' when performing bit padding in the corresponding field in activation/release DCI of a configured grant.

for the case where PDCCH validation for activation/release is achieved when the corresponding filled with '1', the UE performs padding of '1' when performing bit padding in the corresponding field in activation/release DCI of a configured grant.

For example, for the case in which PDCCH validation for activation/release is achieved when an FDRA field is filled with '1' (according to an RA type or a DCI format) for activation/release DCI interpretation and validation, the UE performs padding of '1' when performing bit padding in a corresponding field in activation/release DCI of a configured grant.

Through the implementation A7, the UE and the BS may perform activation/release DCI interpretation and validation without need to determine the accurate length of a DCI field during generation, interpretation, and validation of activation/release DCI.

In Terms of BS

The aforementioned implementations will be described again in terms of a BS.

Figure 12:
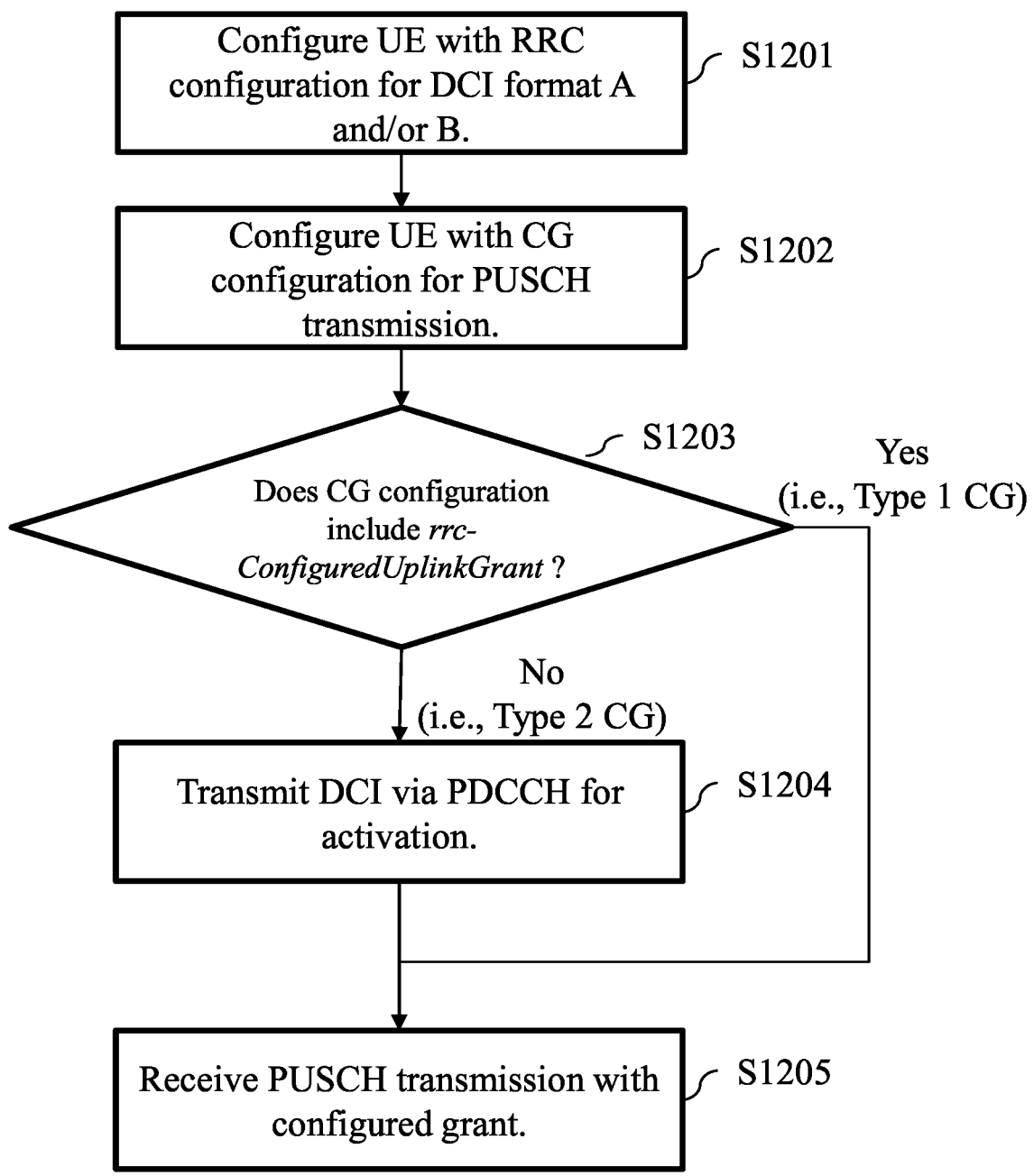
FIG. 12 is a diagram showing an example of a BS operation according to some implementation(s) of the present disclosure.

FIG. 12 is a diagram showing an example of a BS operation according to some implementation(s) of the present disclosure. According to some implementations of the present disclosure, the BS may determine a DCI format and RRC parameter to be used to transmit a configured grant. Hereinafter, an example of the BS operation according to some implementations of the present disclosure will be described. The BS operation according to implementations of the present disclosure is not limited to the following example.

(1) The BS may configure RRC parameter(s) for each of a plurality of DCI formats to the UE and may transmit the configured RRC parameter(s) to the UE (S1201). For example, the BS may configure higher layer parameters indicating a frequency domain allocation type, an RBG size, whether to apply transform precoding, a TDRA table, a frequency hopping method, a repetition scheme, a number of repetitions, a DM-RS configuration, an MCS table, an RV field bit length, an HARQ process number field bit length, and/or beta-offset, for transmission based on the corresponding DCI format for each of the plurality of DCI formats and may transmit the configured RRC parameter(s) to the UE through RRC signaling.

The operation of configuring a parameter to be applied to each of the DCI formats and transmitting the configured parameter to the UE through RRC signaling to the UE by the BS may be implemented by, for example, the device of FIG. 2 or 3. For example, referring to FIG. 2, the one or more processors 102 may configure a parameter to be applied to each of the DCI formats and may control the one or more transceivers 106 and/or the one or more memories 104 to transmit the configured parameter to the UE through RRC signaling, and the one or more transceivers 106 may transmit the configured parameter to the UE through RRC signaling.

In some implementations of the present disclosure, the higher layer parameters may be transmitted in an RRC Connection Setup procedure in an initial access procedure.

(2) The BS may configure a plurality of parameters to be included in a CG configuration to the UE and may transmit the CG configuration including the plurality of configured parameters to the UE through RRC signaling (S1202). In some implementations of the present disclosure, the BS may transmit an RRC configuration for each DCI format and a CG configuration to the UE separately or together or may transmit the CG configuration before the RRC configuration for each DCI format.

The operation of configuring the plurality of parameters to be included in the CG configuration and transmitting the CG configuration including the plurality of configured parameter to the UE through RRC signaling may be implemented by, for example, the device of FIG. 2 or 3. For example, referring to FIG. 2, the one or more processors 102 may configure the plurality of parameters included in the CG configuration and may control the one or more transceivers 106 and/or the one or more memories 104 to transmit the CG configuration including the plurality of configured parameters to the UE, and the one or more transceivers 106 may transmit the CG configuration including the plurality of configured parameters to the UE through RRC signaling.

(3) When rrc-ConfiguredUplinkGrant is not included in the CG configuration (No in S1203), in other words, when a CG based on the CG configuration is a type 2 CG, the BS may transmit DCI for activation of the CG through the PDCCH (S1204).

The operation of transmitting the DCI through the PDCCH by the BS when a parameter rrc-ConfiguredUplinkGrant is not present in the CG configuration may be implemented by, for example, the device of FIG. 2 or 3. For example, referring to FIG. 2, when a parameter rrc-ConfiguredUplinkGrant is not present in the CG configuration, the one or more processors 102 may control the one or more transceivers 106 and/or the one or more memories 104 to transmit the DCI through the PDCCH, and when a parameter rrc-ConfiguredUplinkGrant is not present in the CG configuration, the one or more transceivers 106 may transmit the DCI through the PDCCH.

When rrc-ConfiguredUplinkGrant is not included in the CG configuration (Yes in S1203), in other words, when a CG based on the CG configuration is a type 1 CG, the BS may assume the CG to be assumed based on the CG configuration being transmitted.

(4) The BS may receive PUSCH transmission through the configured grant from the UE (S1205).

The operation of receiving the PUSCH through the configured grant by the BS may be implemented by, for example, the device of FIG. 2 or 3. For example, referring to FIG. 2, the one or more processors 102 may control the one or more transceivers 106 and/or the one or more memories 104 to receive the PUSCH through the configured grant, and the one or more transceivers 106 may receive the PUSCH through the configured grant.

In relation to the BS operation, the following may be additionally considered.

<Implementation B1>

When the BS semi-statically allocates type 2 CG PUSCH transmission to the UE through valid activation DCI, the BS may use only a specific DCI format among a plurality of DCI formats configured for activation, release, and/or retransmission.

The specific DCI format may be configured commonly to a plurality of configured grants through higher layer signaling of the BS or separately for each configured grant. For example, the BS may configure a parameter for selecting one value among {formats0-0-And-0-1, formats0-0-And-0-2, and formats0-0-And-0-1-And-0-2} to the UE and may limit a DCI format to be used in the configured grant. For example, when the BS informs the UE to use formats0-0-And-0-1 among {formats0-0-And-0-1, formats0-0-And-0-2, and formats0-0-And-0-1-And-0-2}, only a DCI format 0_0 and a DCI format 0_1 may be limited to be used to activation/release a type 2 CG. That is, the BS may transmit a parameter for selecting a DCI format to be used to transmit a configured grant among a plurality of DCI formats to the UE, and the UE may select a specific DCI format to be applied to transmission of the configured grant based on the parameter received from the BS. In this case, when a plurality of configured grants are present, the same DCI format may be applied to transmissions of the plurality of configured grants or different DCI formats may be applied thereto.

With regard to transmission of the configured grant, based on the parameter transmitted from the BS, an applied DCI format may be limited to a specific DCI format included in a set of specific DCI formats. For example, the BS may transmit the set of the DCI formats to be applied separately for each of the configured grants or commonly to the configured grants to the UE, and the UE may select one of the DCI formats included in the received set and may apply the selected DCI format to transmission of the configured grant.

Alternatively, the BS may transmit a parameter value indicating each of the DCI formats to be applied to transmission of the configured grant to the UE, and the UE may select a specific DCI format to be applied to transmission of the configured grant by selecting a specific parameter value among the received parameter values. In this case, the DCI formats may be DCI formats included in the DCI format set including the DCI formats to be applied to the configured grant.

For example, the BS may transmit a DCI format set {formats0-0-And-0-1, formats0-0-And-0-2, and formats0-0-And-0-1-And-0-2} or may transmit parameter values indicating the respective DCI formats included in the DCI format set to the UE. When receiving the DCI format set, the UE may select a specific DCI format in the DCI format set and may apply the selected DCI format to the configured grant. When receiving the parameter values indicating the respective DCI formats included in the DCI format set, the UE may select one of the parameter values and may apply a specific DCI format indicated by the selected parameter value to the configured grant.

Alternatively, the specific DCI format may be a DCI format that satisfies the following conditions.

- A DCI format having a corresponding priority during dynamic scheduling when the priority of corresponding transmission is included in the CG configuration and is determined according to the DCI format during dynamic scheduling. For example, when the priority is configured for transmission that is based on the configured grant, the DCI format for dynamic scheduling having the same priority as the configured priority may also be applied to the configured grant.
- A DCI format having a bit length that is equal to or smaller than a bit length of each DCI field of the case in which the corresponding DCI format is used in dynamic scheduling (e.g., a DCI format with CRC scrambled by C-RNTI) even if an RRC parameter (e.g., ConfiguredGrantConfig IE) included in the CG configuration is applied to a certain DCI format. For example, when a parameter included in RRC configuration information of the configured grant is applied to the DCI format, a DCI format having a bit length or bit width equal to or smaller than a bit length or a bit width of each field of the same DCI format as that used in dynamic scheduling may be used in transmission of the configured grant.
- A DCI format used in the same repetition scheme as a repetition scheme for the CG configuration when a repetition scheme is configured for the CG configuration and a repetition scheme is determined according to the DCI format during dynamic scheduling. For example, when the repetition scheme is configured for transmission that is based on the configured grant, a DCI format (used in dynamic scheduling of transmission) using the same repetition scheme as the configured repetition scheme may also be applied to the configured grant.

<Implementation B1-1>

When the BS semi-statically allocates type 2 CG PUSCH transmission to the UE through valid activation DCI, the BS may use DCI having certain characteristics to be used for activation and release.

In more detail, the BS may consider transmission in a specific CORESET and/or search space during PDCCH transmission for activation or release. For example, when a priority of transmission through the corresponding configured grant is configured in a certain CG configuration and a priority of dynamic scheduling is determined according to the CORESET and/or the search space on which the DCI of the dynamic scheduling is transmitted, the BS may transmit valid activation or release DCI for a certain CG configuration only in a CORESET and/or a search space having the same priority of dynamic scheduling as the priority configured in the CG configuration. In other words, the BS may transmit the valid activation DCI or the release DCI to the US in the CORESET and/or the search space having the same priority as the priority in the CG configuration.

<Implementation B2>

When transmitting activation DCI of a type 2 CG PUSCH in a specific DCI format, the BS may use RRC parameter(s) included in the CG configuration in DCI generation. The specific DCI format may be a DCI format having each field with higher configurability than an existing DCI format, for example, a DCI format 0_2. In some implementations, an implementation A2-1 and/or an implementation A2-2 may be considered.

<Implementation B2-1>

When parameter(s) related to the specific DCI format is parameter(s) that limits the size of a certain field of the specific DCI format or is not present in a CG configuration, the corresponding parameter may be applied to DCI interpretation for the CG configuration. In this case, when a DCI field is difficult to interpret using an existing method while having additional flexibility due to the corresponding parameter, the DCI field may be interpreted using the same method as a method of interpreting a corresponding field when a corresponding DCI format is used in dynamic scheduling (e.g., a DCI format 0_2 having a CRC scrambled by a C-RNTI).

For example, when a new resource allocation (RA) type is used in a corresponding DCI format, the BS may use an RA type used in the corresponding DCI format, not the RA type of the CG configuration. That is, when the RA type based on the CG configuration and the RA type based on the DCI format are different from each other, the BS may use the RA type based on the DCI format. In this case, a resource assignment field of the time or frequency domain may be generated using the same method as a method when the corresponding DCI format is used in dynamic scheduling.

In another example, when a certain parameter provided to the UE by the BS through RRC signaling configures a specific field of a corresponding DCI format with 0 bit, that is, omits the specific field, the BS may omit the corresponding DCI field even if the corresponding DCI format is used in the CG configuration. In this case, when the omitted DCI field value is assumed to be '0' or '1' and is not interpreted and the corresponding DCI format is used in dynamic scheduling (e.g., a DCI format 0_2 with CRC scrambled by a C-RNTI), the same value or operation as a value or operation assumed when the corresponding DCI field is omitted may be used for the corresponding field.

<Implementation B2-2>

When the RRC parameter to replace the RRC parameter related to a certain DCI field of the specific DCI format does not exist in the CG configuration, an RRC parameter or a determination method used when the specific DCI format is used in dynamic scheduling (e.g., DCI format 0_2 with CRC scrambled by a C-RNTI) may be used.

For example, when a mcs-table parameter for selecting an MCS table to be used is not included in the CG configuration, the BS may use a predefined/configured MCS table or a mcs-table parameter configured to determine the same may be used for a DCI format 0_2 with CRC scrambled by a C-RNTI, with respect to the DCI format 0_2 with CRC scrambled by the C-RNTI.

That is, in the implementation B2-1 and/or the implementation B2-2, when transmitting parameter(s) that is different from or is not included in the CG configuration through RRC signaling, the BS may perform PUSCH reception using the parameter(s) transmitted through RRC signaling. In some implementations, the DCI field may be partially omitted through RRC signaling.

<Implementation B3>

When transmitting activation DCI of a type 2 CG PUSCH in a specific DCI format, the BS may use an RRC parameter or interpretation method used when the specific DCI format is used in dynamic scheduling (e.g., a DCI format 0_2 with CRC scrambled by a C-RNTI) rather than using the RRC parameter included in the CG configuration in DCI generation. The specific DCI format may be a DCI format (e.g., a DCI format 0_2) having each field with higher configurability than an existing DCI format. More specifically, the following may be considered.

<Implementation B3-1>

When the implementation B3 is used, the BS may exceptionally use the RRC parameter included in the CG configuration with respect to the specific RRC parameter related to a certain field. For example, the specific RRC parameter may be at least one of the following:

repK or pusch-AggregationFactor;
repK-RV;
rbg-Size;
mcs-Table;
mcs-TableTransformPrecoder;
DMRS-Configuration or cg-DMRS-Configuration;
frequencyHopping; and/or
p0-PUSCH-Alpha.

According to the implementation B3-1, the BS may freely configure an RRC parameter for dynamic scheduling while multiplexing different configured grants with each other or allocating the same resource as a configured grant to a plurality of UEs by using the same RRC parameter as dynamic scheduling for ease of DCI interpretation and also maintaining some flexibility and configurability of the configured grant.

<Implementation B4>

When the BS transmits a CG configuration including specific RRC parameter (e.g., rrc-ConfiguredUplinkGrant) for resource allocation to semi-statically allocate type 1 CG PUSCH transmission to the UE, the BS may assume a specific DCI format in order to generate the specific RRC parameter. The specific DCI format may be configured commonly to a plurality of configured grants or separately for each configured grant, through higher layer signaling of the BS.

For example, the BS may configure a parameter for selecting one value among {formats0-0, formats0-1, and formats0-2} to the UE and may assume the corresponding configured DCI format for interpretation of rrc-ConfiguredUplinkGrant of the configured grant. When this parameter is not present, the BS may assume a specific DCI format (e.g., a DCI format 0_1) for this as a default. That is, when the BS does not transmit the parameter for selecting the specific DCI format from the BS, the UE may assume a specific DCI format (e.g., a DCI format 0_1) in order to generate rrc-ConfiguredUplinkGrant of the configured grant.

Alternatively, the specific DCI format may be a DCI format that satisfies the following condition. In some implementations of the present disclosure, when a plurality of DCI formats satisfy the corresponding condition, the specific DCI format may be assumed to be a DCI format having a larger size or a DCI format 0_1.

A DCI format having a corresponding priority during dynamic scheduling, when a priority of corresponding transmission is configured for the CG configuration and a priority is determined according to a DCI format during dynamic scheduling. That is, when a priority is configured for transmission that is based on the configured grant, the DCI format for dynamic scheduling having the same priority as the configured priority may also be applied to the configured grant. For example, when a DCI format having the specific priority used during dynamic scheduling is a DCI format 0_1, DCI of the DCI format 0_1 may also be applied to a CG configuration having the same priority as the specific priority.

A DCI format having a bit length that is equal to or smaller than a bit length of each DCI field of the case in which the DCI format having a bit length or width of each DCI field based on an RRC parameter of the CG configuration is used in dynamic scheduling (e.g., a DCI format with CRC scrambled by a C-RNTI), when the RRC parameter (e.g., ConfiguredGrantConfig IE) included in the CG configuration is applied to a certain DCI format. That is, in the case in which a parameter included in RRC configuration information of the configured grant is applied to a DCI format, when the DCI format has a bit length or bit width equal to or smaller than a bit length or bit length of each field of the same DCI format as that used in dynamic scheduling, the DCI format may be used in transmission of the configured grant. For example, in the case in which a parameter included in RRC configuration information of the configured grant is applied to a DCI format 0_1, when a bit length or bit width of each field of the DCI format 0_1 used in dynamic scheduling is equal to or longer than the DCI format 0_1 of the configured grant, the DCI format 0_1 may be used in transmission of the configured grant.

A DCI format using the same repetition scheme during dynamic scheduling, when a repetition scheme is configured in a CG configuration and a repetition scheme is determined according to a DCI format during dynamic scheduling. That is, when the repetition scheme is configured to transmission that is based on the configured grant, a DCI format for dynamic scheduling using the same repetition scheme as the configured repetition scheme may also be applied to the configured grant. For example, when a repetition scheme in a CG configuration is set to be a repetition type B, a repetition scheme in an RRC configuration in the DCI format 0_1 is set to be a repetition type A, and a repetition scheme in an RRC configuration in the DCI format 0_2 is set to be a repetition type B, the BS may generate an RRC parameter included in the CG configuration based on the RRC configuration for the DCI format 0_2.

The specific RRC parameter may be a set of a plurality of parameters that refer to respective fields of a certain DCI format. In this case, when the specific RRC parameter is a set of certain RRC parameters, different sets may be used according to the selected specific DCI format.

<Implementation B4-1>

When the BS uses a specific DCI format in order to generate a specific parameter (e.g., rrc-ConfiguredUplinkGrant) for resource allocation of a certain CG configuration, the BS may use an RRC parameter or interpretation method used when the specific DCI format is used in dynamic scheduling (e.g., a DCI format with CRC scrambled by a C-RNTI) rather than using an RRC parameter included in the CG configuration to generate a parameter based on the specific DCI format.

When the BS uses the specific DCI format in order to generate a specific parameter (e.g., rrc-ConfiguredUplinkGrant) for resource allocation of a certain CG configuraiotn, the BS may use an RRC parameter or generation method used when the specific DCI format is used in dynamic scheduling (e.g., a DCI format with CRC scrambled by a C-RNTI) rather than using an RRC parameter included in the CG generation to generate a parameter based on the corresponding DCI format.

For example, when one of the DCI format A and the DCI format B is used to generate the specific parameter, the BS may generate the specific parameter based on an RRC parameter referenced when the DCI format A is used in dynamic scheduling in the case in which the specific RRC parameter needs to be interpreted based on the DCI format A and the BS may generate the specific parameter with reference to an RRC parameter included in the corresponding CG configuration when the specific parameter needs to be interpreted based on the DCI format B. For example, in a situation in which one of the DCI format 0_0 and the DCI format 0_1 is to be used to generate the specific parameter, when the BS informs the UE that the DCI format 0_1 is a DCI format related to the CG configuration, the BS may generate the specific parameter based on a parameter in an RRC configuration for the DCI format 0_1, and when the BS informs the UE that some parameters (e.g., a resource allocation type in the frequency domain) are not configured by RRC and the DCI format 0_0 using a predefined value (e.g., a resource allocation type 0) is a DCI format related to a CG configuration, the BS may generate the specific parameter with reference to the RRC parameter (e.g., a resource allocation type included in a CG configuration) included in the CG configuration.

That is, when the DCI format 0_1 is used to generate a specific parameter for a configured grant based transmission, an RRC parameter applied when the DCI format 0_1 is used for dynamic scheduling (i.e., when the DCI format 0_1 is transmitted through a PDCCH) may be applied to generate the specific parameter.

The specific DCI format may be a DCI format (e.g., a DCI format 0_2) having each field with higher configurability than an existing DCI format.

<Implementation B4-2>

When the BS uses a specific DCI format in order to generate a specific RRC parameter (e.g., rrc-ConfiguredUplinkGrant) for resource allocation of a certain CG configuration, an RRC parameter related to the specific DCI format may not be included in the specific RRC parameter. In other words, the certain parameter may be an optional parameter. In this case, the BS may perform the same operation as the case in which a DCI field related to the omitted parameter is omitted. For example, when the BS uses a default of a certain field of the DCI format 0_2 when the corresponding field of the DCI format 0_2 is omitted by the RRC parameter, the BS may also perform the same operation when an RRC parameter indicating the corresponding field is omitted.

That is, when a specific field of a specific DCI format is omitted by an RRC parameter, the specific field may be recognized by the BS as being a default. Similarly, even if the RRC parameter for omitting the specific field is not transmitted or is not included in the CG configuration, the BS may interpret the specific field in the same way as in the case in which the specific field is omitted by the RRC parameter.

<Implementation B5>

When a BS receives DCI in a PDCCH for resource allocation and release of a configured grant configuration, a joint activation/release operation of one of a plurality of configured grants may be considered. For example, a configured grant that has the same configured grant index as a value indicated by an HARQ process number field included in DCI may be activated/released.

In order to interpret DCI related to one configured grant configuration, the BS that allocates a plurality of configured grant configurations may use the following RRC parameter or RRC parameter set. When a value of each field included in the DCI is generated, interpreted, and assumed, different options may be used.

Option 1: The BS uses a configured grant configuration (i.e., ConfiguredGrantConfig) having the same configured grant index as a value indicated by the HARQ process number field.

Option 2: When the UE receives a plurality of configured grant configurations, at least DCI for release may use a RRC parameter set (e.g., pusch-config) used in dynamic scheduling.

Option 3: For a specific field (e.g., FDRA, HPN, RV field, etc.), a separate RRC parameter may be configured or a specific parameter value may be predetermined. For example, a separate resourceAllocation parameter for validating a value of an FDRA field for release may be configured or a specific RA type, for example, an RA type 0 or RA type 1 may be assumed.

<Implementation B6>

When a BS transmits DCI in a PDCCH for resource allocation and release of a configured grant configuration, a joint activation/release operation for simultaneously activating/releasing a plurality of configured grants may be considered. For example, the BS may transmit one DCI to release resource allocation of one or more configured grant configurations that is previously activated for the UE. In this case, a plurality of configured grant configurations may be related to one DCI. For example, an RRC parameter (e.g., entry of Type2Configuredgrantconfig-ReleaseStateList) related to a value indicated by an HARQ process number field included in DCI may include one or more configured grant indexes.

When a plurality of configured grant configurations is related to one DCI and is activated/released through the DCI, the BS and the UE may use the following RRC parameter or RRC parameter set in order to generate and interpret DCI. When a value of each field included in the DCI is generated, interpreted, and assumed, different options may be used
- Option 1: The BS uses a configured grant configuration (i.e., ConfiguredGrantConfig) having the lowest index among configured grant indexes included in a RRC parameter (e.g., entry of Type2Configuredgrantconfig-ReleaseStateList) that has the same state index as a value indicated by an HARQ process number field.
- Option 2: When the UE receives a plurality of configured grant configurations or receives a configuration for simultaneously releasing a plurality of configured grant configurations (e.g., if Type2Configuredgrantconfig-ReleaseStateList is configured), at least DCI for release may use an RRC parameter set (e.g., pusch-config) used in dynamic scheduling.
- Option 3: For a specific field (e.g., FDRA, HPN, RV field, etc.), a separate RRC parameter may configured or a specific parameter value may be predetermined. For example, a separate resourceAllocation parameter for validating a value of an FDRA field for release may be configured or a specific RA type, for example, an RA type 0 or RA type 1 may be assumed.

To generate and interpret the DCI, the BS may also determine the length of a DCI field using the same RRC parameter/parameter set. For example, when the same ConfiguredGrantConfig as an HARQ ID included in DCI is assumed for DCI interpretation, the length of the FDRA field may be determined through the resourceAllocation, rbg-Size included in ConfiguredGrantConfig and the length of an RB of a UL bandwidth part. In this case, when a DCI format 0_2 is used, an additional parameter (e.g., resourceAllocation-ForDCIFormat0_2, resourceAllocationType1GranularityForDCI-Format0-2-r16) included in the pusch-config may be exceptionally used. According to this, the RRC parameter used is included in only in 0_2, and thus the UE may assume a more accurate DCI length, and the BS may not introduce an unnecessary parameter in order to adjust a DCI size.

<Implementation B7>

Based on the NR Rel.15 standard, the UE may not expect that the size of a corresponding field of DCI for a configured grant configuration is larger than the size of a corresponding field of dynamic scheduling, and may expect that a field is padded to '0' to have the same value of the corresponding field of dynamic scheduling when the size of each field of DCI for the configured grant configuration and DCI for dynamic scheduling is small.

That is, the BS may not configure the size of a corresponding field of DCI of a configured grant configuration to be larger than the size of a corresponding field of dynamic scheduling and may expect the size of the corresponding field of DCI of the configured grant configuration is the same as the corresponding field of dynamic scheduling by padding '0' to the field when the size of the corresponding field of DCI of the configured grant configuration is smaller than the corresponding field of dynamic scheduling. The length of the DCI field determined for activation/release DCI of the SPS/CG may also be different from the length of the corresponding DCI field that is based on dynamic scheduling. In this case, the BS may make the lengths of fields using the following method.

In the implementation B7, when the UE performs bit padding in activation/release DCI of a configured grant for size alignment between a specific field in activation/release DCI of SPS/CG and a corresponding field in dynamic scheduling DCI, (1) for the case where PDCCH validation for activation/release is achieved when the corresponding field is filled with '0', the UE performs padding of '0' when performing bit padding in the corresponding field in activation/release DCI of a configured grant.

(2) for the case where PDCCH validation for activation/release is achieved when the corresponding field is filled with '1', the UE performs padding of '1' when performing bit padding in the corresponding field in activation/release DCI of a configured grant.

For example, for the case in which PDCCH validation for activation/release is achieved when an FDRA field is filled with '1' (according to an RA type or a DCI format) for activation/release DCI interpretation and validation, the UE performs padding of '1' when performing bit padding in a corresponding field in activation/release DCI of a configured grant.

Through the implementation B7, the UE and the BS may perform activation/release DCI interpretation and validation without need to determine the accurate length of a DCI field during generation, interpretation, and validation of activation/release DCI.

FIG. 13 illustrates a flow of signal transmission/reception between a UE and a BS according to some implementations of the present disclosure.

Referring to FIG. 13, the UE may receive an RRC configuration for each of a plurality of DCI formats and a CG configuration from the BS (S1301a, S1301b, and S1301c). When the UE further receives a CG configuration including a specific parameter, the UE may assume a specific DCI format and may interpret the specific parameter to determine a resource for a configured grant according to some implementation(s) of the present disclosure (S1303a). When receiving a CG configuration that does not include the specific parameter, the UE may receive activation DCI from the BS through a PDCCH and may interpret the activation DCI to determine the resource for the configured grant according to some implementation(s) of the present disclosure (S1303b). The UE may perform PUSCH transmission using the determined resource (S1305).

The BS and the UE may expect DCI used in configured scheduling to be generated/interpreted and transmitted/received according to some implementations of the present disclosure. According to some implementations of the present disclosure, the BS may minimize an unnecessary RRC configuration to reduce signaling overhead and may prevent malfunction between the UE and the BS during a process of generating and transmitting DCI. According to some implementations of the present disclosure, implementation complexity may be reduced, and the UE may receive and interpret DCI for a grant configured with ambiguity.

Implementations of the present disclosure may be separately applied or one or more implementations may be combined and applied.

The UE may perform operations for transmission of a PUSCH according to some implementations of the present disclosure. The UE may include at least one transceiver, at least one processor, and at least one computer memory operatively connected to the at least one processor and configured to store instructions that, when executed, cause the at least one processor to perform operations according to some implementations of the present disclosure. A processing device for the UE may include at least one processor, and at least one computer memory operatively connected to the at least one processor and configured to store instructions that, when executed, cause the at least one processor to perform operations according to some implementations of the present disclosure. A computer-readable storage medium may store at least one computer program including instructions that, when executed by at least one processor, cause the at least one processors to perform the operations according to some implementations of the present disclosure. In some implementations of the present disclosure, the operations may comprise, for example: receiving an RRC configuration including first configuration information for a first DCI format and second configuration information for a second DCI format, receiving a configured grant configuration including a repetition scheme and resource allocation information, determining resource allocation of a configured grant based on i) configuration information including the same repetition scheme as the repetition scheme in the configured grant configuration among the first configuration information and the second configuration information, and ii) the resource allocation information, and performing PUSCH transmission based on the resource allocation. Each of the first configuration information and the second configuration information may include a TDRA table. In some implementations of the present disclosure, the configured grant may be a type 1 configured grant. In some implementations of the present disclosure, the first DCI format may be a DCI format 0_1 and determining the resource allocation of the configured grant may include determining resource allocation of the configured grant based on the first configuration information, based on both the first configuration information and the second configuration information including the same repetition scheme as the repetition scheme in the configured grant configuration. In some implementations of the present disclosure, the second DCI format may be a DCI format 0_2.

The BS may perform operations in order to receive a PUSCH from the UE according to some implementations of the present disclosure. The BS may include at least one transceiver, at least one processor, and at least one computer memory operatively connected to the at least one processor and configured to store instructions that, when executed, cause the at least one processor to perform operations according to some implementations of the present disclosure. A processing device for the BS may include at least one processor, and at least one computer memory operatively connected to the at least one processor and configured to store instructions that, when executed, cause the at least one processors to perform operations according to some implementations of the present disclosure. A computer-readable storage medium may store at least one computer program including instructions that, when executed by at least one processor, cause the at least one processors to perform operations according to some implementations of the present disclosure. In some implementations of the present disclosure, the operations may comprise, for example: transmitting an RRC configuration including first configuration information for a first DCI format and second configuration information for a second DCI format, generating resource allocation information for resource allocation of a configured grant, transmitting a configured grant configuration including a repetition scheme for the configured grant and the resource allocation information, and performing PUSCH reception based on the resource allocation. Generating the resource allocation information may include generating the resource allocation information based on i) configuration information including the same repetition scheme as the repetition scheme in the configured grant configuration among the first configuration information and the second configuration information, and ii) the resource allocation information. Each of the first configuration information and the second configuration information may include a TDRA table. In some implementations of the present disclosure, the configured grant may be a type 1 configured grant. In some implementations of the present disclosure, the first DCI format may be a DCI format 0_1, and generating the resource allocation information may include generating the resource allocation information based on the first configuration information based on both the first configuration information and the second configuration information including the same repetition scheme as the repetition scheme in the configured grant configuration. In some implementations of the present disclosure, the second DCI format may be a DCI format 0_2.

The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

INDUSTRIAL AVAILABILITY

The implementations of the present disclosure may be used in a BS, a UE, or other equipment in a wireless communication system.

The invention claimed is:

1. A method of transmitting a physical uplink shared channel (PUSCH) by a user equipment (UE) in a wireless communication system, the method comprising:
    receiving a radio resource control (RRC) configuration that includes first configuration information for a first downlink control information (DCI) format and second configuration information for a second DCI format, wherein each of the first configuration information and the second configuration information includes a configuration of a time domain resource allocation (TDRA) table;
    receiving a configured grant configuration that includes a repetition type and resource allocation information for a configured grant;
    determining a resource allocation for the configured grant, based on i) the first or second configuration information, and ii) the resource allocation information included in the configured grant configuration; and
    performing a PUSCH transmission based on the resource allocation of the configured grant,
    wherein the resource allocation of the configured grant is determined based on:
    the first configuration information based on the first configuration information including a same repetition type as the repetition type included in the configured grant configuration, and
    the second configuration information based on the first configuration information not including the same repetition type as the repetition type included in the configured grant configuration.

2. The method of claim 1, wherein the configured grant is a type 1 configured grant.

3. The method of claim 1,
wherein the first DCI format is a DCI format 0_1, and
wherein determining the resource allocation of the configured grant includes: determining the resource allocation of the configured grant based on the first configuration information, based on both the first configuration information and the second configuration information including the same repetition type as the repetition type included in the configured grant configuration.

4. The method of claim 3, wherein the second DCI format is a DCI format 0_2.

5. A user equipment (UE) configured for transmitting a physical uplink shared channel (PUSCH) in a wireless communication system, the UE comprising:
at least one transceiver;
at least one processor; and
at least one computer memory operatively connected to the at least one processor and configured to store instructions that, when executed, cause the at least one processor to perform operations comprising:
receiving a radio resource control (RRC) configuration that includes first configuration information for a first downlink control information (DCI) format and second configuration information for a second DCI format, wherein each of the first configuration information and the second configuration information includes a configuration of a time domain resource allocation (TDRA) table;
receiving a configured grant configuration that includes a repetition type and resource allocation information for configured grant;
determining a resource allocation for the configured grant based on i) the first or second configuration information, and ii) the resource allocation information included in the configured grant configuration; and
performing a PUSCH transmission based on the resource allocation of the configured grant,
wherein the resource allocation of the configured grant is determined based on:
the first configuration information based on the first configuration information including a same repetition type as the repetition type included in the configured grant configuration, and
the second configuration information based on the first configuration information not including the same repetition type as the repetition type included in the configured grant configuration.

6. The UE of claim 5, wherein the configured grant is a type 1 configured grant.

7. The UE of claim 5,
wherein the first DCI format is a DCI format 0_1, and
wherein determining the resource allocation of the configured grant includes: determining the resource allocation of the configured grant based on the first configuration information, based on both the first configuration information and the second configuration information including the same repetition type as the repetition type in the configured grant configuration.

8. The UE of claim 7, wherein the second DCI format is a DCI format 0_2.

9. A method of receiving a physical uplink shared channel (PUSCH) from a user equipment (UE) by a base station in a wireless communication device, the method comprising:
transmitting a radio resource control (RRC) configuration that includes first configuration information for a first downlink control information (DCI) format and second configuration information for a second DCI format, wherein each of the first configuration information and the second configuration information includes a configuration of a time domain resource allocation (TDRA) table;
transmitting a configured grant configuration that includes a repetition type and resource allocation information for a configuration grant; and
performing a PUSCH reception based on resource allocation of the configured grant,
wherein the resource allocation of the configured grant is determined based on i) the first or second configuration information and ii) the resource allocation information included in the configured grant configuration; and
wherein the resource allocation of the configured grant is determined based on:
the first configuration information based on the first configuration information including a same repetition type as the repetition type included in the configured grant configuration, and
the second configuration information based on the first configuration information not including the same repetition type as the repetition type included in the configured grant configuration.

10. The method of claim 9, wherein the configured grant is a type 1 configured grant.

11. The method of claim 9,
wherein the first DCI format is a DCI format 0_1, and
wherein the resource allocation of the configured grant is determined based on the first configuration information, based on both the first configuration information and the second configuration information including the same repetition type as the repetition type included in the configured grant configuration.

12. The method of claim 11, wherein the second DCI format is a DCI format 0_2.

13. A base station (BS) configured for receiving a physical uplink shared channel (PUSCH) from a user equipment (UE) in a wireless communication system, the BS comprising:
at least one transceiver;
at least one processor; and
at least one computer memory operatively connected to the at least one processor and configured to store instructions that, when executed, cause the at least one processor to perform operations comprising:
transmitting a radio resource control (RRC) configuration that includes first configuration information for a first downlink control information (DCI) format and second configuration information for a second DCI format, wherein each of the first configuration information and the second configuration information includes a configuration of a time domain resource allocation (TDRA) table;
transmitting a configured grant configuration that includes a repetition type and resource allocation information for a configured grant; and
performing a PUSCH reception based on resource allocation of the configured grant,
wherein the resource allocation of the configured grant is determined based on i) the first or second configuration information, and ii) the resource allocation information included in the configured grant configuration; and the first configuration information based on the first configuration information including a same repetition type as the repetition type included in the configured grant configuration, and
the second configuration information based on the first configuration information not including the same repetition type as the repetition type included in the configured grant configuration.

* * * * *

UNITED STATES PATENT AND TRADEMARK OFFICE
CERTIFICATE OF CORRECTION

PATENT NO. : 11,638,282 B2
APPLICATION NO. : 17/735930
DATED : April 25, 2023
INVENTOR(S) : Duckhyun Bae et al.

Page 1 of 1

It is certified that error appears in the above-identified patent and that said Letters Patent is hereby corrected as shown below:

In the Claims
In Column 58, Claim 1, Line 45, replace "of" with --for--;
In Column 58, Claim 1, Line 55, replace "of" with --for--;
In Column 58, Claim 1, Line 56, replace "of" with --for--; and
In Column 58, Claim 1, Line 61, replace "and" with --or--.

In Column 59, Claim 3, Line 3, replace "of" with --for--; and
In Column 59, Claim 3, Line 5, replace "of" with --for--.

In Column 59, Claim 5, Line 28, replace "of" with --for--;
In Column 59, Claim 5, Line 32, before "configured" insert --the--;
In Column 59, Claim 5, Line 38, replace "of" with --for--;
In Column 59, Claim 5, Line 39, replace "of" with --for--; and
In Column 59, Claim 5, Line 44, replace "and" with --or--.

In Column 59, Claim 7, Line 53, replace "of" with --for--; and
In Column 59, Claim 7, Line 55, replace "of" with --for--.

In Column 60, Claim 9, Line 4, replace "of" with --for--;
In Column 60, Claim 9, Line 10, replace "of" with --for--;
In Column 60, Claim 9, Line 11, replace "of" with --for--;
In Column 60, Claim 9, Line 15, replace "of" with --for--; and
In Column 60, Claim 9, Line 20, replace "and" with --or--.

In Column 60, Claim 11, Line 29, replace "of" with --for--.

In Column 60, Claim 13, Line 53, replace "of" with --for--;
In Column 60, Claim 13, Line 59, replace "of" with --for--;
In Column 60, Claim 13, Line 60, replace "of" with --for--; and
In Column 61, Claim 13, Line 4, replace "and" with --or--.

Signed and Sealed this
Fifteenth Day of August, 2023

Katherine Kelly Vidal
*Director of the United States Patent and Trademark Office*